United States Patent
Vandame et al.

(10) Patent No.: US 10,944,990 B2
(45) Date of Patent: Mar. 9, 2021

(54) METHOD FOR ENCODING AT LEAST ONE MATRIX OF IMAGE VIEWS OBTAINED FROM DATA ACQUIRED BY A PLENOPTIC CAMERA, AND CORRESPONDING ELECTRONIC DEVICES

(71) Applicant: THOMSON Licensing, Issy-les-Moulineaux (FR)

(72) Inventors: Benoit Vandame, Betton (FR); Fabien Racape, Rennes (FR); Paul Kerbiriou, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 386 days.

(21) Appl. No.: 16/024,529

(22) Filed: Jun. 29, 2018

(65) Prior Publication Data

US 2019/0124360 A1    Apr. 25, 2019

(30) Foreign Application Priority Data

Jun. 30, 2017   (EP) .................................... 17305833

(51) Int. Cl.
*H04N 19/597* (2014.01)
*H04N 19/136* (2014.01)
(Continued)

(52) U.S. Cl.
CPC ............ *H04N 19/597* (2014.11); *H04N 5/30* (2013.01); *H04N 19/136* (2014.11); *H04N 19/176* (2014.11); *H04N 19/593* (2014.11)

(58) Field of Classification Search
None
See application file for complete search history.

(56) References Cited

U.S. PATENT DOCUMENTS

| 9,269,163 B2 | 2/2016 | Le et al. |
| 2015/0109522 A1 | 4/2015 | Kimura |

(Continued)

FOREIGN PATENT DOCUMENTS

| EP | 3094076 | 11/2016 |
| GB | 2488905 | 9/2012 |

(Continued)

OTHER PUBLICATIONS

Y. Li, R. Olsson and M. Sjöström, "Compression of unfocused plenoptic images using a displacement intra prediction," 2016 IEEE International Conference on Multimedia & Expo Workshops (ICMEW), Seattle, WA, 2016, pp. 1-4, doi: 10.1109/ICMEW.2016.7574673. (Year: 2016).*

(Continued)

*Primary Examiner* — Stuart D Bennett
(74) *Attorney, Agent, or Firm* — Robert D. Shedd

(57) ABSTRACT

A method for encoding at least one matrix of image views obtained from data acquired by a plenoptic camera is disclosed. Image views of the matrix of image views are partitioned into blocks. For a given image view of the at least one matrix of views, the method includes obtaining at least one block to be encoded and a matching block, wherein a difference between the at least one block to be encoded and the matching block fulfills a block matching criterion; determining a residual block regarding the at least one block to be encoded and the matching block, the determining using modified pixels of the at least one block to be encoded and modified pixels of the matching block according to flux variation parameters associated with a pixel sensor of the plenoptic camera; and encoding the residual block.

15 Claims, 24 Drawing Sheets

(51) Int. Cl.
*H04N 19/176* (2014.01)
*H04N 5/30* (2006.01)
*H04N 19/593* (2014.01)

(56) References Cited

U.S. PATENT DOCUMENTS

2015/0319456 A1  5/2015  Le
2016/0241855 A1  8/2016  Le et al.

FOREIGN PATENT DOCUMENTS

| GB | 2535475 | 8/2016 | |
| GB | 2539417 | 12/2016 | |
| WO | WO 2013180192 | 12/2013 | |
| WO | WO 2017068022 A1 | 4/2017 | |
| WO | WO 2017068022 A9 | 8/2017 | |
| WO | WO-2018209703 A1 * | 11/2018 | ........... H04N 5/2226 |

OTHER PUBLICATIONS

Purica et al, "Multiview Plus Depth Video Coding With Temporal Prediction View Synthesis", pp. 1-15.
Sun et al, "Sparse Hierarchical Nonparametric Bayesian Learning for Light Field Representation and Denoising", 2016 International Joint Conference on Neural Networks, pp. 3272-3279.
Jiang et al, "Light Field Compression with Homography-Based Low Rank Approximation", pp. 1-13.
Wanner et al, "Generating EPI Representation of a 4D Light Fields with a Single Lens Focused Plenoptic Camera", Springer-Verlag Berlin Heidelberg, 2011, pp. 90-101.
Hebert et al, "Scene Flow Estimation from Light Fields via the Preconditioned Primal-Dual Algorithm", Institute for Computer Graphics and Vision Graz University of Technology, pp. 1-12.
Helin et al, "Sparse Modelling and Predictive Coding of Subaperture Images for Lossless Plenoptic Image Compression", Department of Signaling Processing, Tampere University of Technology, 2016 IEEE, pp. 1-4.

* cited by examiner

METHOD FOR ENCODING AT LEAST ONE MATRIX OF IMAGE VIEWS OBTAINED FROM DATA ACQUIRED BY A PLENOPTIC CAMERA, AND CORRESPONDING ELECTRONIC DEVICES

REFERENCE TO RELATED EUROPEAN APPLICATION

This application claims priority from European Patent Application No. 17305833.0, entitled "METHOD FOR ENCODING AT LEAST ONE MATRIX OF IMAGE VIEWS OBTAINED FROM DATA ACQUIRED BY A PLENOPTIC CAMERA, AND CORRESPONDING ELECTRONIC DEVICES", filed on Jun. 30, 2017, the contents of which are hereby incorporated by reference in its entirety.

TECHNICAL FIELD

The disclosure relates to the encoding and decoding of 4D raw light field data being acquired by a plenoptic camera.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Plenoptic cameras comprises in addition to features of conventional cameras a micro-lens array set positioned just in front of the sensor as illustrated in FIG. 1, or in documents WO 2013/180192 and GB 2488905. In such architecture, each micro-lens projects on a sensor a micro-lens image. Hence, a plenoptic camera can record a set of micro-lens images (usually called a 4D raw light field data or also a plenoptic image, or a raw plenoptic image) which can be processed in order to perform for example re-focusing of images. It should be noted that such 4D raw light field data can be converted into other format/representation (for example via a format corresponding to a set of sub-aperture images (where a sub-aperture image corresponds to a captured image of a scene from a point of view, the point of view being slightly different between two sub-aperture images; these sub-aperture images give information about the parallax and depth of the imaged scene), or via a format corresponding to a set of epipolar images (see for example the article entitled : "*Generating EPI Representation of a 4D Light Fields with a Single Lens Focused Plenoptic Camera*", by S. Wanner and al., published in the conference proceedings of ISVC 2011)).

Therefore, obtaining an efficient encoding technique for encoding data being a set of sub-aperture images (also named a matrix of sub-aperture images) is a hectic research issue due to the fact it can reduce the storage (or transmission) of such encoded data.

A solution for encoding data being a set of sub-aperture images consists in using the technique described in the article entitled "*Light Field Compression with Homography-based Low Rank Approximation*" by Xiaoran Jiang et al. that proposes to align the different sub-aperture images by using one or multiple homographies in order to obtain a light field low rank representation, and then encode such light field low rank representation using classical HEVC encoding technique.

Another solution for encoding data being a set of sub-aperture images consists in using classical encoding techniques such as HEVC ("*High Efficiency Video Coding*") or MV-HEVC ("*Multi-view High Efficiency Video Coding*") as mentioned in document US 2015/0319456 where a reference image is selected in the set of sub-aperture images. In addition, in document US 2015/0319456, the encoding of the sub-aperture images can be done according to compression parameters (e.g. motion search windows, maximum coding unit size, etc.) and camera parameters (focal length, main lens aperture, etc.). Hence, in some cases, each sub-aperture image can be encoded independently from the others sub-aperture images by using intra-encoding techniques as proposed by the HEVC encoding scheme. In a variant, one or more reference images are selected among the set of sub-aperture images (see for example paragraph [0086] of document US 2015/0319456) for performing the encoding based on spatial predictions. The document US 2016/0241855 details the encoding of a sequence of plenoptic images that can be viewed as a sequence of matrixes of sub-aperture images.

However, none of the cited documents tackles the issue of flux variation in the sub-aperture images induced by the configuration of a plenoptic camera, in which all the micro-images comprise the same number of pixels (for example 4), but the repartition of these pixels behind a micro-lens is not centered with the micro-lens images (i.e. a pixel can only partially acquire light from a micro-lens).

Hence, there is a need to provide an efficient way of processing the encoding and decoding of sub-aperture images which takes into account the flux variation issue within a plenoptic camera.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed a method for encoding at least one matrix of image views obtained from data acquired by a plenoptic camera, wherein image views of said matrix of image views are partitioned into blocks. The method is remarkable in that it comprises, for a given image view of said at least one matrix of views:

obtaining at least one block to be encoded and a matching block, wherein a difference between said at least one block to be encoded and said matching block fulfills a block matching criterion;

determining a residual block regarding said at least one block to be encoded and said matching block, said determining comprising using modified pixels of said least one block to be encoded and modified pixels of said matching block according to flux variation parameters associated with a pixel sensor of said plenoptic camera; and encoding said residual block.

It should be noted that due to the fact that the matrix of image views (also named a matrix of sub-aperture images) is obtained from a plenoptic camera, the sub-aperture images have some light flux variation between themselves. Indeed, such light flux variation between the sub-aperture images that can be an issue for video encoding. The light flux variation is induced by the design of a plenoptic camera. Indeed, it may come from the sampling of the micro-images and the vignetting of the main-lens within the plenoptic camera. Hence, it is a purpose of the proposed technique to reduce the effect of the light flux variation when a device encodes a matrix of image views obtained/derived from a plenoptic camera.

The flux variation parameters are linked to the change of the center of the micro-lens compared to the center of the group of pixels below the micro-lens.

In a preferred embodiment, the flux variation parameters are defined according to an estimation of decentering of micro-images centers compared to pixels alignments associated with micro-images.

In a preferred embodiment, the method for encoding is remarkable in that said matching block is comprised in said given image view.

In a preferred embodiment, the method for encoding is remarkable in that said matching block is comprised in a reference image view comprised in said at least one matrix of image views, or in another matrix of image views.

In a preferred embodiment, the method for encoding is remarkable in that said at least one block to be encoded and said matching block are prediction blocks according to HEVC standard.

In a preferred embodiment, the method for encoding is remarkable in that said at least one block to be encoded and said matching block are blocks according to H.264 standard.

In a preferred embodiment, the method for encoding is remarkable in that said block matching criterion is defined by a threshold value.

In another embodiment of the disclosure, it is proposed a method for decoding at least one matrix of encoded image views obtained from data acquired by a plenoptic camera, wherein the encoded image views of said at least one matrix of image views comprise encoded blocks.

The method is remarkable in that it comprises, for a given encoded image view of said at least one matrix:
obtaining a predictor block and a residual block;
obtaining pixels of a block to be decoded according to said residual block, said predictor block and flux variation parameters associated with a pixel sensor of said plenoptic camera.

In a preferred embodiment, the method for decoding is remarkable in that said flux variation parameters are defined according to an estimation of decentering of micro-images centers compared to pixels alignments associated with micro-images.

In a preferred embodiment, the method for decoding is remarkable in that said predictor block corresponds to block $M_1(u_1, v_1, \alpha_1, \beta_1)$, noted $M_1[\alpha_1, \beta_1]$, which is comprised in an image view at coordinates $(u_1, v_1)$ and related to pixel at coordinates $(\alpha_1, \beta_1)$, and said block to be decoded corresponds to block $M_2(u_2, v_2, \alpha_2, \beta_2)$, noted $M_2[\alpha_2, \beta_2]$ which is comprised in an image view at coordinates $(u_2, v_2)$ and related to pixel at coordinates $(\alpha_2, \beta_2)$, and wherein said obtaining pixels comprises obtaining value of pixel at coordinates $(l, m)$ within said block $M_2(u_2, v_2, \alpha_2, \beta_2)$, via the following equation:

$$M_2[l, m] = \left( \frac{M_1[l, m]}{R_{u_1, v_1}(\alpha_1, \beta_1)} + Res_{1,2}[l, m] \right) R_{u_2, v_2}(\alpha_2, \beta_2)$$

where the ratios $R_{u_1, v_1}(\alpha_1, \beta_1)$ and $R_{u_2, v_2}(\alpha_2, \beta_2)$ are ratios of flux associated with pixels, and $Res_{1,2}[l, m]$ corresponds to a pixel value at coordinates $(l, m)$ in said residual block.

In a preferred embodiment, the method for decoding is remarkable in that it comprises determining said ratios $R_{u_1, v_1}(\alpha_1, \beta_1)$ and $R_{u_2, v_2}(\alpha_2, \beta_2)$ from parameters $\delta$, $\Phi$, d and D, where $\delta$ is a physical size of a pixel in said pixel sensor in said plenoptic camera, $\Phi$ is a diameter of a main lens in said plenoptic camera, d is a distance between a micro-lens array in said plenoptic camera and said pixel sensor, and D is a distance between said main lens and said micro-lens array.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In one embodiment of the disclosure, it is proposed an electronic device for encoding at least one matrix of image views obtained from data acquired by a plenoptic camera, wherein image views of said matrix of image views are partitioned into blocks. The electronic device comprises a processor and at least one memory unit coupled to said processor, and for a given image view of said at least one matrix of views, the processor is configured to:

obtain at least one block to be encoded and a matching block, wherein a difference between said at least one block to be encoded and said matching block fulfills a block matching criterion;

determine a residual block regarding said at least one block to be encoded and said matching block, that comprises a use of modified pixels of said least one block to be encoded and modified pixels of said matching block according to flux variation parameters associated with a pixel sensor of said plenoptic camera; and encode said residual block.

In a preferred embodiment, the electronic device for encoding is remarkable in that said flux variation parameters are defined according to an estimation of decentering of micro-images centers compared to pixels alignments associated with micro-images.

In another embodiment of the disclosure, it is proposed an electronic device for decoding at least one matrix of encoded image views obtained from data acquired by a plenoptic camera, wherein the encoded image views of said at least one matrix of image views comprise encoded blocks. The electronic device comprises a processor and at least one memory unit coupled to said processor, and, for a given encoded image view of said at least one matrix, the processor is configured to:

obtain a predictor block and a residual block;

obtain pixels of a block to be decoded according to said residual block, said predictor block and flux variation parameters associated with a pixel sensor of said plenoptic camera.

In a preferred embodiment, the electronic device for decoding is remarkable in that said predictor block corresponds to block $M_1(u_1, v_1, \alpha_1, \beta_1)$, noted $M_1[\alpha_1, \beta_1]$, which is comprised in an image view at coordinates $(u_1, v_1)$ and related to pixel at coordinates $(\alpha_1, \beta_1)$, and said block to be decoded corresponds to block $M_2(u_2, v_2, \alpha_2, \beta_2)$, noted $M_2[\alpha_2, \beta_2]$ which is comprised in an image view at coordinate $(u_2, v_2)$ and related to pixel at coordinates $(\alpha_2, \beta_2)$, and wherein said obtaining pixels comprises obtaining value of pixel at coordinates (l, m) within said block $M_2(u_2, v_2, \alpha_2, \beta_2)$, via the following equation:

$$M_2[l, m] = \left(\frac{M_1[l, m]}{R_{u_1, v_1}(\alpha_1, \beta_1)} + Res_{1,2}[l, m]\right) R_{u_2, v_2}(\alpha_2, \beta_2)$$

where the ratios $R_{u_1, v_1}(\alpha_1, \beta_1)$ and $R_{u_2, v_2}(\alpha_2, \beta_2)$ are ratios of flux associated with pixels, and $Res_{1,2}[l, m]$ corresponds to a pixel value at coordinates (l, m) in said residual block.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

In the following, a picture or image (i.e. an image view or a sub-aperture image) contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

A block of a picture (or block image or block) means a set of pixels which belong to this picture and the pixel values of a block means the values of the pixels which belong to this block.

Figure 1:
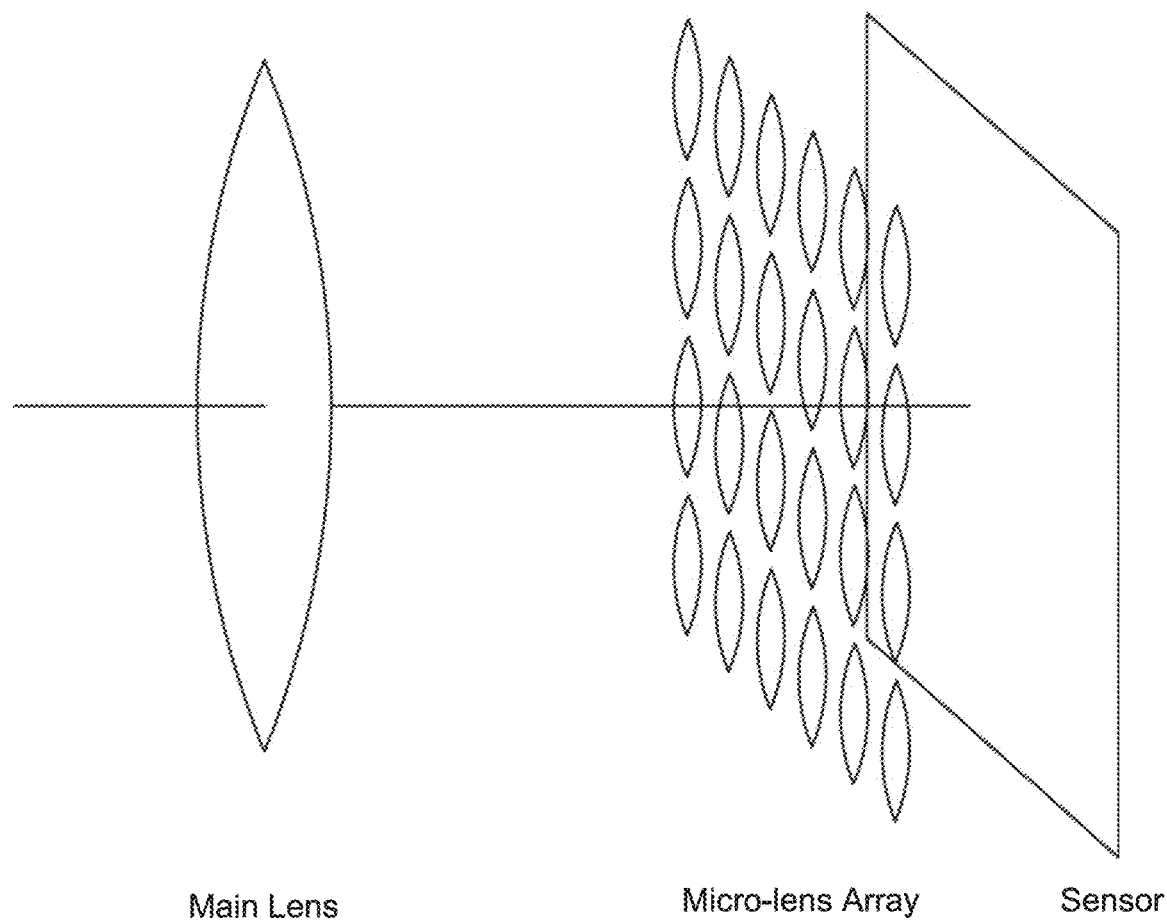
FIG. 1 depicts in a schematic way features comprised in a plenoptic camera according to the state of the art.

FIG. 1 depicts in a schematic way features comprised in a plenoptic camera according to the state of the art.

Usually, a plenoptic camera comprises a micro-lens array which is positioned between a main lens and an image sensor. The sensor of a plenoptic camera records an image which is made of a collection of 2D small images arranged within a 2D image. The 2D small images are called micro-lens images, and they are generated by the lenses from the micro-lens array. Usually, the lenses and the corresponding micro-lens images can be identified within a 2D coordinate system (such as a Cartesian coordinate system, where a lens is identified by a couple of integer (i,j)). Hence, a pixel of the image sensor (which can also be identified within a 2D coordinate system) can be associated with 4 coordinates (x,y,i,j). Therefore, a pixel of the image sensor can record L(x,y,i,j) which is a 4D light-field.

Figure 2:
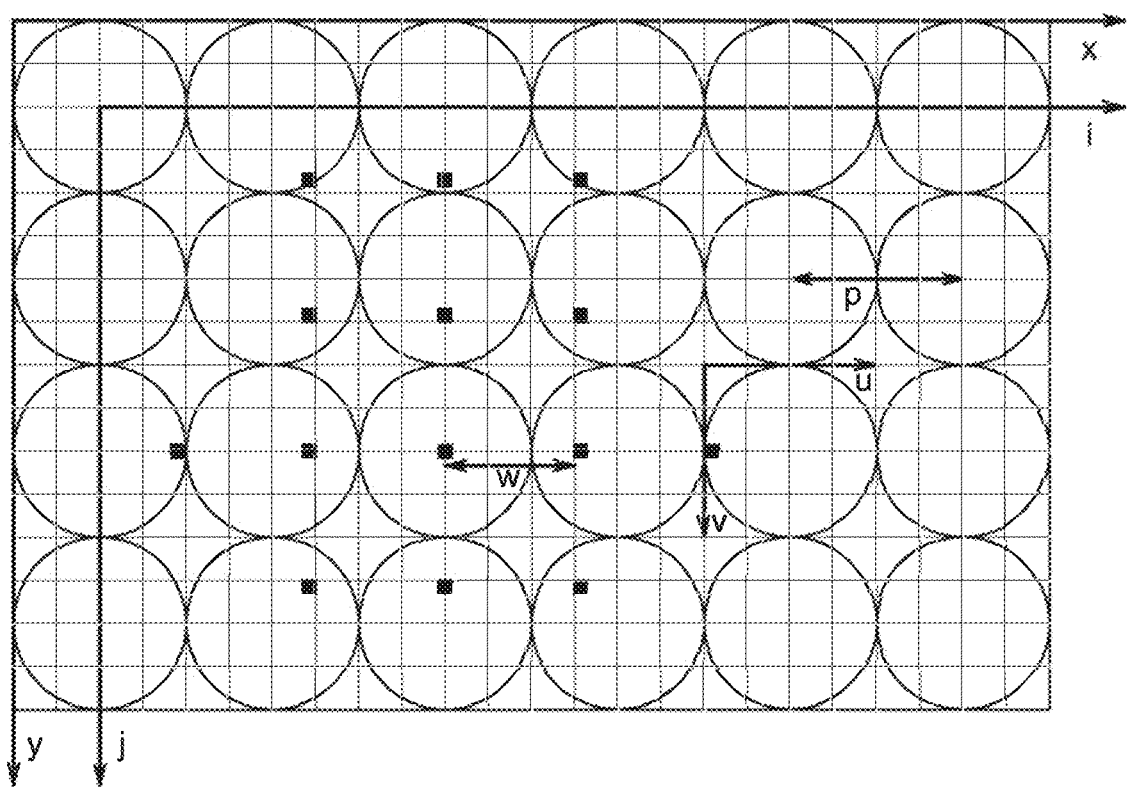
FIG. 2 presents how micro-images generated by micro-lenses are recorded by an image sensor within a plenoptic camera according to the state of the art.

FIG. 2 illustrates the image which is recorded by the sensor. Indeed, FIG. 2 presents how micro-images generated by micro-lenses are recorded by an image sensor within a plenoptic camera according to the state of the art.

The main lens is an ideal thin lens with a focal distance F and a diameter Φ. The F-number of the main lens is O=F/Φ.

The micro lens array is made of micro-lenses having a focal distance f. The pitch of the micro-lenses is φ. The F-number of the micro-lens is o=f/φ (assuming that the diameter of the micro-lens is equal to the micro-lens pitch). The micro-lens array is located at the fix distance D from the main lens. The micro-lenses might have any shape like circular or squared. The diameter of the shape is lower or equal to φ. One can consider the peculiar case where the micro-lenses are pinholes. In this context, the following equation remains valid with f=d.

The sensor is made of a square lattice of pixels having a physical size of δ.δ is in unit of meter per pixel. The sensor is located at the fix distance d from the micro-lens array.

The object (not visible in FIG. 3 and FIG. 4) is located at the distance z of the main lens. This object is focused by the main lens at a distance z' from the main lens. The disparity of the object between two consecutive lenses is equal to W. The distance between 2 micro-lens image centers is p.

Each micro-lens produces a micro-image represented by a circle (the shape of the small image depends on the shape of the micro-lenses which is typically circular). Pixel coordinates are labelled (x,y). p is the distance between the centers of two consecutive micro-images, p is not necessary an integer value. Usually, micro-lenses are chosen such that p is larger than a pixel size δ. Micro-lens images are referenced by their coordinate (i,j). Each micro-lens image samples the pupil of the main-lens with a (u,v) coordinate system. Some pixels might not receive any photons from any micro-lens; those pixels are discarded. Indeed, the inter micro-lens space is masked out to prevent photons to pass outside from a micro-lens (if the micro-lenses have a square shape, no masking is needed). The center of a micro-lens image (i,j) is located on the sensor at the coordinate ($x_{i,j}$, $y_{i,j}$). θ is the angle between the square lattice of pixel and the square lattice of micro-lenses, in FIG. 2, induces that θ=0. Assuming the micro-lenses are arranged according to a regular square lattice, the ($x_{i,j}$, $y_{i,j}$) can be computed by the following equation considering ($x_{0,0}$, $y_{0,0}$) the pixel coordinate of the micro-lens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

FIG. 2 also illustrates that an object from the scene is visible on several contiguous micro-lens images (represented by the dark dots). The distance between 2 consecutive views of an object is noted w, this distance will be named the replication distance in this document. An object is visible on r consecutive micro-lens images with:

$$r = \left\lfloor \frac{p}{|p-w|} \right\rfloor \quad (2)$$

r is the number of consecutive micro-lens images in one dimension. An object is visible in $r^2$ micro-lens images.

Depending on the shape of the micro-lens image, some of the $r^2$ views of the object might be invisible.

Optical Property of a Plenoptic Camera

The distances p and w introduced in the previous sub-section are given in unit of pixel. They are converted into physical unit distance (meters) respectively P and W by multiplying them by the pixel size δ: W=δw and P=δp. These distances depend on the plenoptic camera characteristics.

Figure 3:
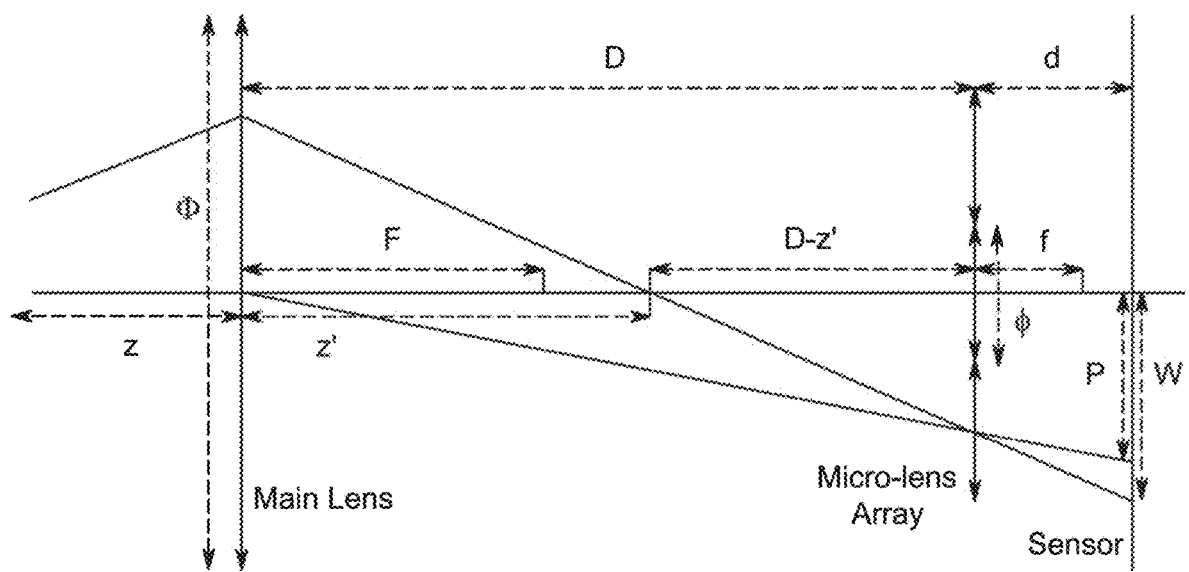
FIG. 3 presents a first schematic plenoptic type II camera according to the state of the art.
Figure 4:
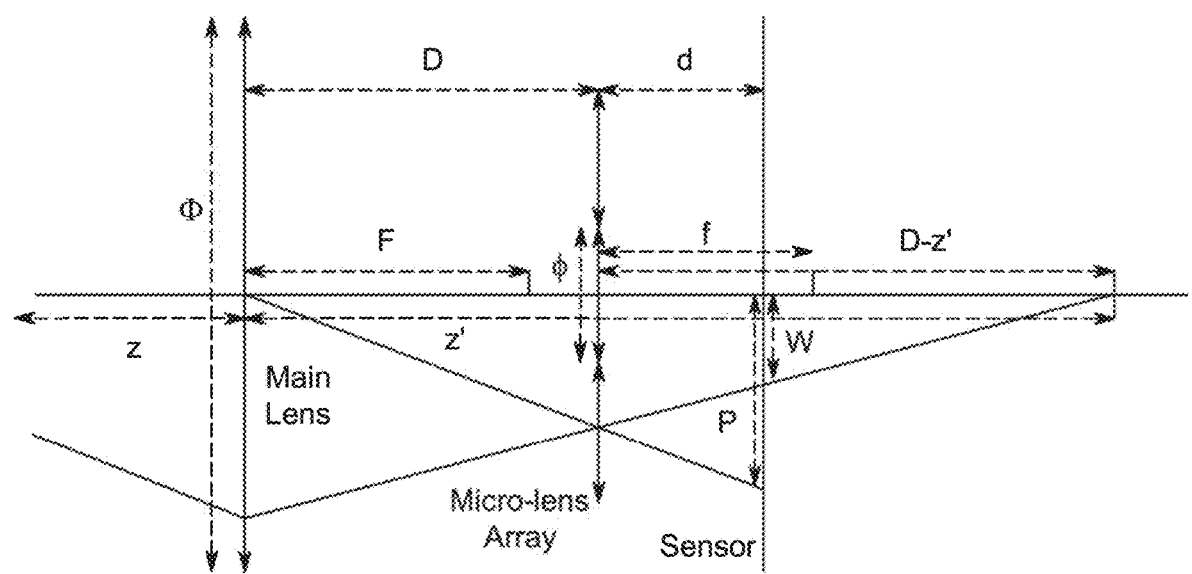
FIG. 4 presents a second schematic plenoptic type II camera according to the state of the art.

FIG. 3 presents a schematic plenoptic type II camera with W>P according to the state of the art, and FIG. 4 presents a schematic plenoptic type II camera with W<P according to the state of the art.

In the plenoptic camera of FIGS. 3 and 4, the main-lens has a focal length F and an aperture Φ. The micro-lens array comprises micro-lenses having a focal length f. The pitch of the micro-lens array is φ. The micro-lens array is positioned at a distance D from the main-lens, and a distance d from the sensor. The object (not visible on the figures) is located at a distance z from the main-lens (i.e. at the left of the main lens in the Figures). This object is focused by the main-lens at a distance z' from the main-lens (i.e. at the right of the main lens). FIG. 3 and FIG. 4 illustrate the cases where respectively D>z' and D<z'. In both cases, micro-lens images can be in focus depending on d and f. This design refers to the so-called type II plenoptic camera.

Figure 5:
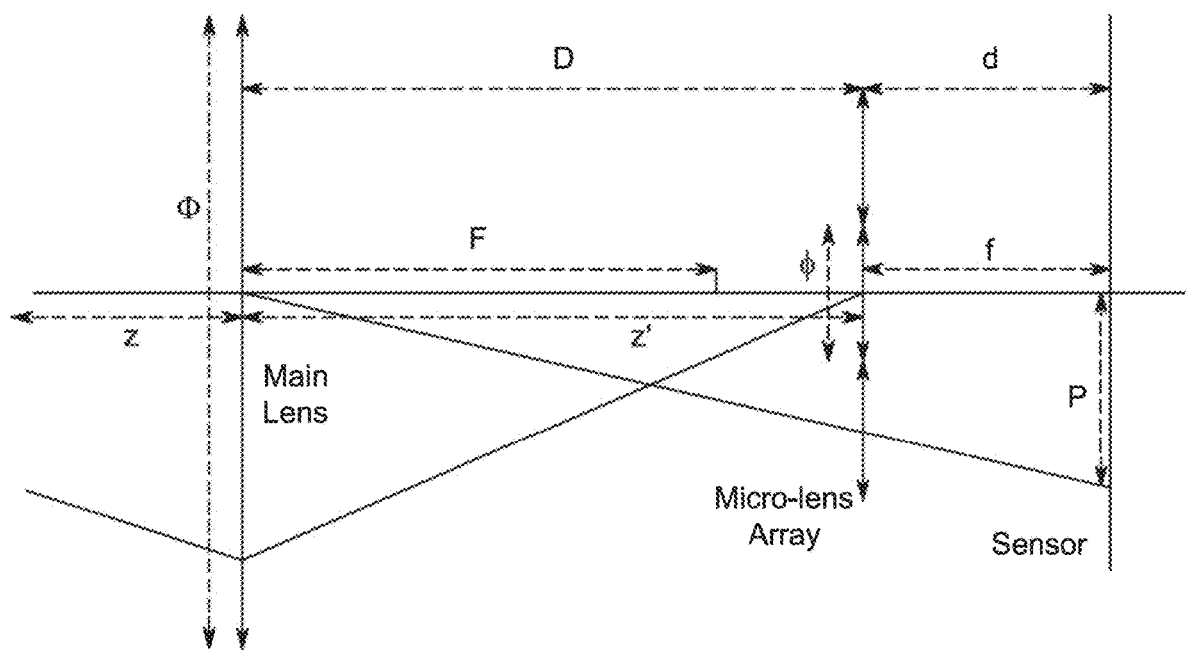
FIG. 5 presents a schematic plenoptic type I camera according to the state of the art.

A similar design consists in fixing f=d, one speaks about the so-called type I plenoptic camera (see FIG. 5). This design is made such that the main-lens is focusing images close to the micro-lens array. If the main-lens is focusing exactly on the micro-lens array, then W=∞. Also the micro-lens images are fully out-of-focus and equal to a constant (not considering noise).

The replication distance W varies with the z the distance of the object. To establish the relation between W and z, one relies on the thin lens equation:

$$\frac{1}{z} + \frac{1}{z'} = \frac{1}{F} \quad (3)$$

And the Thales law:

$$\frac{D - z'}{\phi} = \frac{D - z' + d}{W} \quad (4)$$

Mixing the 2 previous equations on deduces:

$$W = \phi\left(1 + \frac{d}{D - \frac{zF}{z - F}}\right) \quad (5)$$

The relation between W and z does not assume that the micro-lens images are in focus. Micro-lens images are strictly in focus according to the thin lens equation:

$$\frac{1}{D - z'} + \frac{1}{d} = \frac{1}{f} \quad (6)$$

Also from the Thales law one derives P $$e = \frac{D + d}{D} \quad (7)$$
$$P = \phi e$$

The ratio e defines the enlargement between the micro-lens pitch and the micro-lens images pitch. This ratio is very close to 1 since D»d.

Sub-Aperture Images

The micro-images can be re-organized into the so-called sub-aperture images (also named image views). A sub-aperture image collects all 4D light-field pixels having the same (u,v) coordinates (i.e. the pixels that are associated with the same part of a decomposition of the pupil). Let I×J being the number of micro-lenses covering the sensor, and $N_x \times N_y$ the number of pixels of the sensor. The number of sub-aperture images is equal to p×p. Each sub-aperture image has a size of (I,J)=($N_x$/p, $N_y$/p) pixels.

Figure 6A:
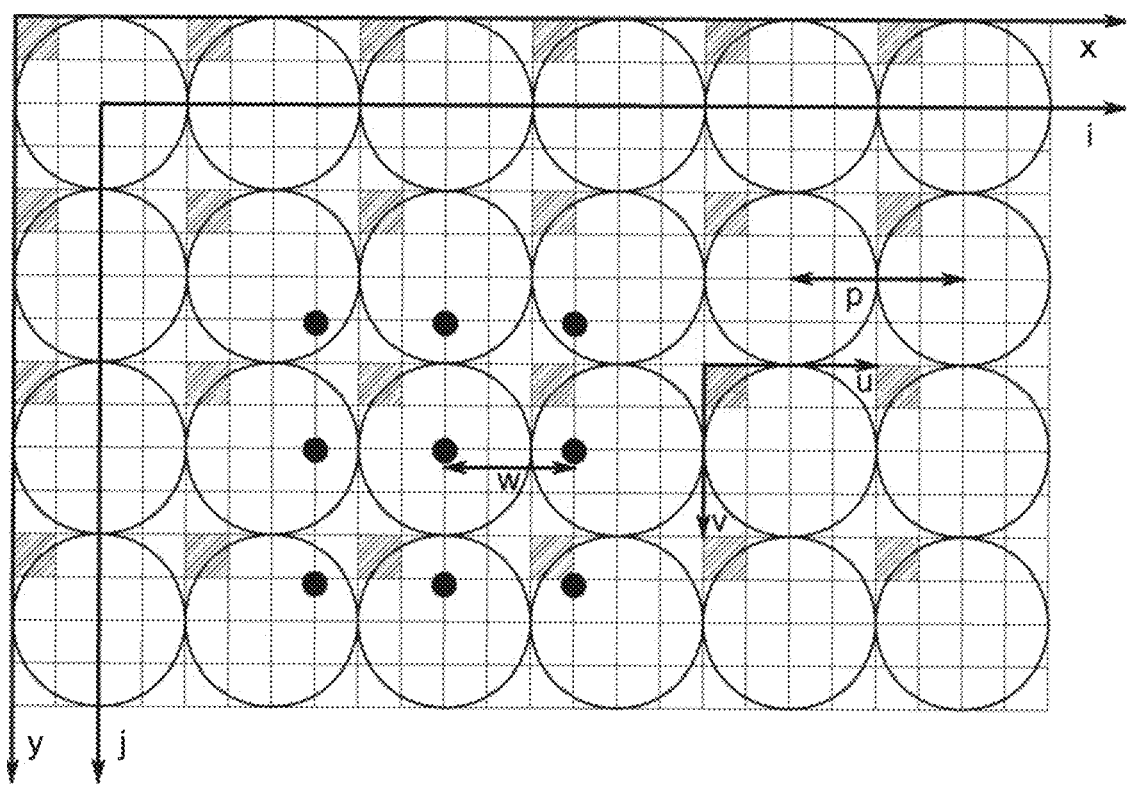
FIGS. 6(a) and 6(b) present an example of the conversion of light-field pixels into sub-aperture images.
Figure 6B:
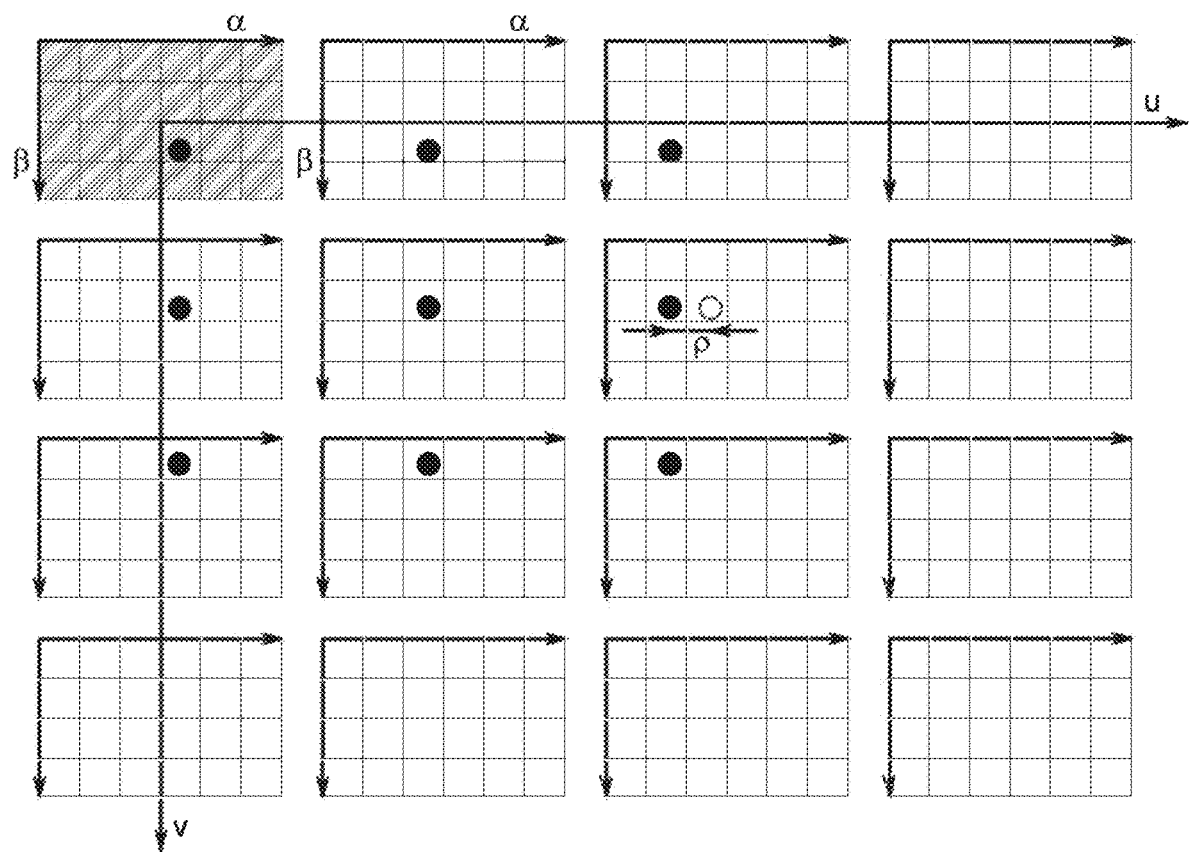

FIGS. 6(a) and 6(b) illustrate the conversion between the captured light-field image coordinate L(x,y,i,j) (see FIG. 6(a)) into the series of sub-aperture images S(α, β, u, v) (see FIG. 6(b)). Each sub-aperture image has a size of (I,J) pixels, the axis are labeled (α, β) with (α, β)∈[0,I[×[0,J[. S(u, v) denotes the 2D image corresponding to the (u, v) pupil coordinate made of I×J pixels.

The relations between (x,y,i,j) and (α, β, u, v) are defined as follow:

$$(\alpha, \beta, u, v) = \left(\left\lfloor \frac{x}{p} \right\rfloor, \left\lfloor \frac{y}{p} \right\rfloor, x \bmod p, y \bmod p\right) \quad (8)$$

Where [.] denotes the floor function, and mod denotes the modulo function.

If p is not exactly an integer but close to an integer, then the sub-aperture images can be computed easily considering the distance between the micro-lens image equal to [p] the integer just smaller than p. This case occurs especially when the micro-lens diameter φ is equal to an integer number of pixels. In the case, p=φe being slightly larger than φ since e=(D+d)/d is slightly greater than 1. The advantage of considering [p] is that the sub-aperture images are computed without interpolation since one pixel L(x, y, i,j) corresponds to an integer coordinate sub-aperture pixel S(α, β, u, v). The drawback is that the portion of a pupil from which photons are recorded is not constant within a given sub-aperture image S(u, v). To be precise, S(u, v) sub-aperture image is not exactly sampling the (u, v) pupil coordinate. Nevertheless, even though the sub-apertures images are sampling a (u, v) coordinate which varies slightly with the pixel coordinate (α, β) the proposed technique is effective. If p is not an integer, or if the micro-lens array is rotated versus the pixel array, then the sub-aperture images need to be determined or computed using interpolation since the centers ($x_{i,j}$, $u_{i,j}$) of the micro-lenses are not integer.

In the following, we consider that the sub-aperture images are computed considering [p] the integral part of micro-image pitch. The advantage is that the sub-aperture images are extracted without any loss in signal, and the raw image can be recovered also without any signal degradation. In addition, by abuse of notation, we consider that [p] and p are equivalent.

Image Re-Focusing
Disparity on the Sub-Aperture Images

Within the light-field image $L(x,y,i,j)$ an object is made visible on several micro-images with a replication distance w. On the sub-aperture images, an object is also visible several times. From one sub-aperture image to the next horizontal one, an object coordinate $(\alpha, \beta)$ appears shifted by the disparity $\rho$. The relation between $\rho$ and w is defined by:

$$\rho = \frac{1}{w-p} \qquad (9)$$

Also it is possible to establish a relation between the disparity $\rho$ and the distance z of the object by mixing equations (5) and (9):

$$\rho = \frac{\delta D}{\phi d}\left(\frac{D}{z'} - 1\right) \qquad (10)$$

Projecting the Light-Field Pixels on Re-Focus Image

Image refocusing consists in projecting the light-field pixels $L(x,y,i,j)$ recorded by the sensor into a 2D refocused image of coordinate $(X, Y)$. The projection is performed by shifted the micro-images $(i,j)$:

$$\begin{bmatrix} X \\ Y \end{bmatrix} = s\begin{bmatrix} x \\ y \end{bmatrix} - sw_{focus}\begin{bmatrix} i \\ j \end{bmatrix} \qquad (11)$$

Where $w_{focus}$ is the selected replication distance corresponding to $z_{focus}$ the distance of the objects that appear in focus in the computed refocused image. s is a zoom factor which controls the size of the refocused image. The value of the light-field pixel $L(x,y,i,j)$ is added on the refocused image at coordinate $(X, Y)$. If the projected coordinate is non-integer, the pixel is added using interpolation. To record the number of pixels projected into the refocus image, a weight-map image having the same size than the refocus image is created. This image is preliminary set to 0. For each light-field pixel projected on the refocused image, the value of 1.0 is added to the weight-map at the coordinate $(X, Y)$. If interpolation is used, the same interpolation kernel is used for both the refocused and the weight-map images. After, all the light-field pixels are projected, the refocused image is divided pixel per pixel by the weight-map image. This normalization step, ensures brightness consistency of the normalized refocused image.

Addition of the Sub-Aperture Images to Compute the Re-Focus Image

Equivalently, the refocused images can be computed by summing-up the sub-aperture images $S(\alpha, \beta)$ taking into consideration the disparity $\rho_{focus}$ for which objects at distance $z_{focus}$ are in focus.

$$\begin{bmatrix} X \\ Y \end{bmatrix} = s\begin{bmatrix} \alpha \\ \beta \end{bmatrix} + s\rho_{focus}\begin{bmatrix} u \\ v \end{bmatrix} \qquad (12)$$

The sub-aperture pixels are projected on the refocused image, and a weight-map records the contribution of this pixel, following the same procedure described above.

Flux-Scale Variation Between Sub-Aperture Images

Usually, the sub-aperture images are showing flux variation between themselves. The flux variation between the sub-aperture induced by either the sampling of the micro-images and/or the vignetting of the main-lens, can be an issue when an encoding (i.e. a compression) of the sub-aperture images has to be performed.

Sampling of the Micro-Images

Figure 7:
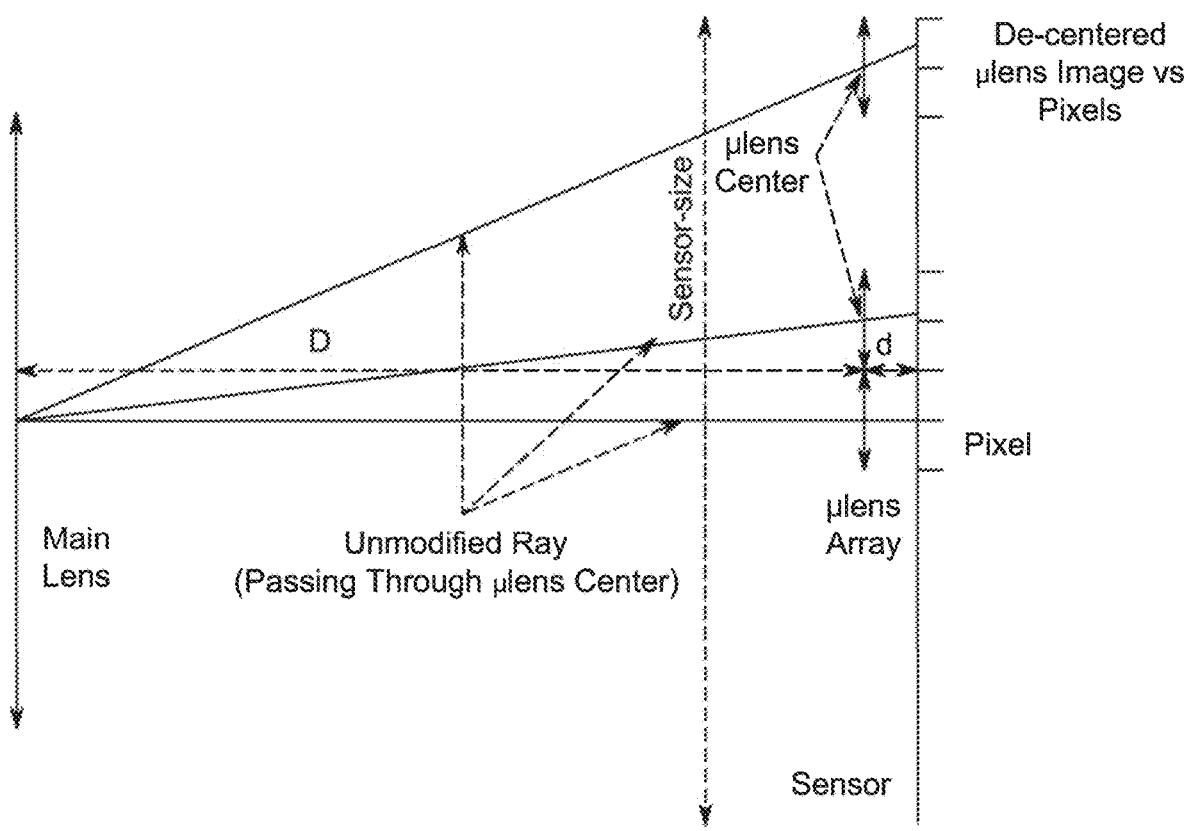
FIG. 7 presents an example of sampling of light field pixels.
Figure 8A:
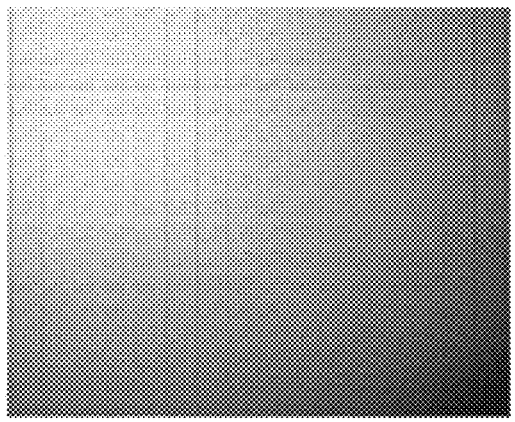
FIGS. 8(a)-(d) presents an example of a matrix of image views comprising 4 image views (or sub-aperture images or pictures) named respectively S(0, 0), S(1, 0), S(0, 1) and S(1, 1)
Figure 8B:
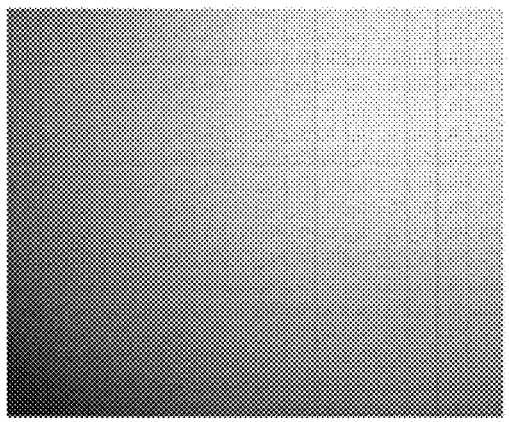
Figure 8C:
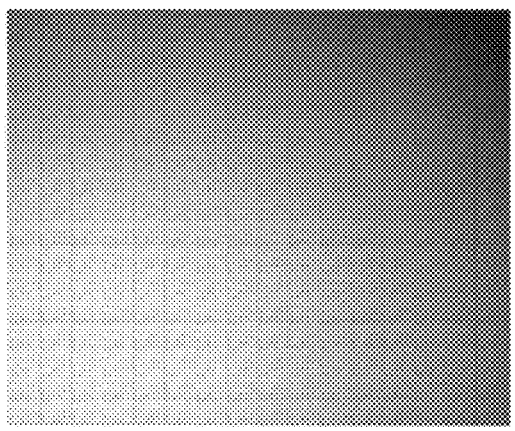
Figure 8D:
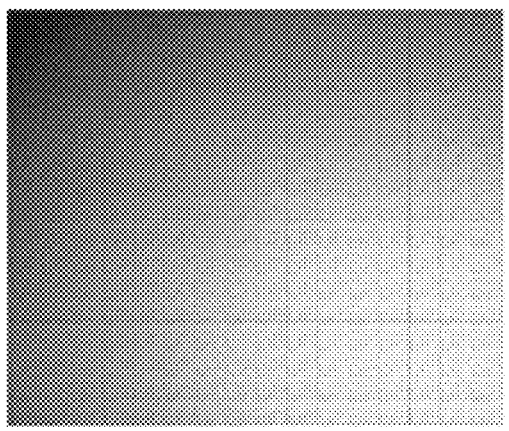
Figure 9:
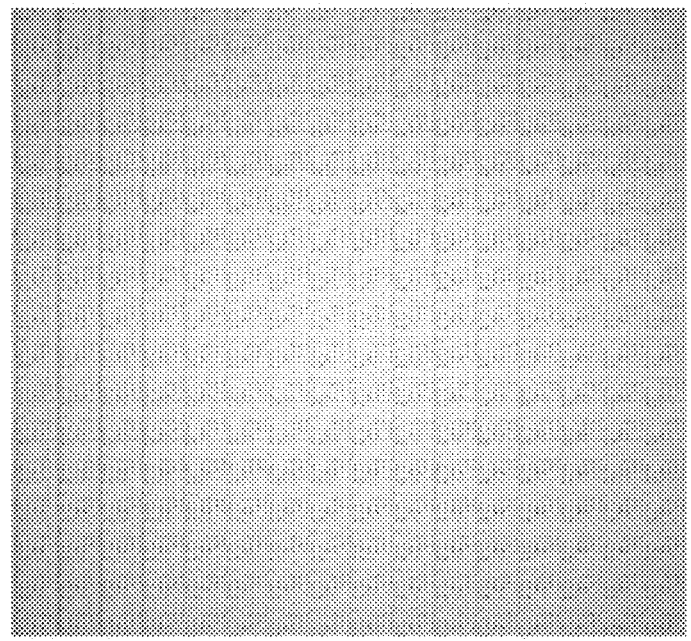
FIG. 9 presents an image view corresponding to the sum of the 4 image views (or sub-aperture images) S(0, 0), S(1, 0), S(0, 1) and S(1, 1) of FIG. 8.

When building a light-field sensor, it is common to stick a micro-lens array where the micro-lens diameter $\phi$ is strictly equal $\phi=k\delta$ where $\delta$ is the physical size of a pixel, and k an integer. FIG. 7 illustrates a case where $k=2$; $\phi=2\delta$. Micro-lenses cover 2×2 pixels. More precisely, the FIG. 7 illustrates unmodified rays passing through the center of the main-lens and the centers of some micro-lenses (assuming thin lens optic). The unmodified rays indicate the positions of the micro-images. One notices that the micro-images centers is equal to the middle of the 2×2 pixels only at the center of the sensor close to the optical axis of the main-lens.

To illustrate this effect, a synthetic plenoptic image captured with an ideal plenoptic camera has been simulated using a PBRT (Physically Based Rendering software) extended to simulate plenoptic camera. One considers the following features for such plenoptic cameras:

| Parameters | Value | Parameters | Value |
| --- | --- | --- | --- |
| $\delta$ | 6 μm | $\Phi$ | 12 mm |
| $\phi$ | 12 μm | $0 = \Phi/F$ | 2 |
| f = d | 18 μm | D = z' | 24.365 mm |
| o = f/$\phi$ | 1.5 | z | 1600 mm |
| F | 24 mm | (I, J) | 1000 × 1000 |
| $(N_x, N_y)$ | 2000 × 2000 | Sensor Size | 12 × 12 mm |
| B | 8.86 μm | | |

It should be noted that the main-lens is considered as an ideal perfect thin lens. The synthetic image is made of a test chart uniformly illuminated. FIG. 8 illustrates the 2×2 sub-aperture images extracted from the raw color plenoptic image. One observes that the light flux varies throughout each sub-aperture image.

It is worth noting that the sum of the 4 sub-aperture images is almost constant. More precisely, the image resulting from the sum is not strictly constant since the micro-images have a size of $2eO/o \times 2eO/o$ pixels (where $e=D+d/_D$) and are not exactly centered in the middle of 2×2 pixels. Thus some photons belonging to the micro-lenses observed at the border of the sensor are lost. Nevertheless, the variation of light flux of the sum of the 4 images is almost negligible, and could be null if the aperture of the main-lens decreases ($\Phi$ being smaller).

Summing the p×p sub-aperture images into a single image is equivalent to having a 2D camera with the main-lens and pixel array having a pixel size p times larger than the light-field sensor. Thus, the sum of the sub-aperture images is showing common images as captured by 2D cameras.

Sampling of the Micro-Images for Homogeneous Flux in the Sub-Aperture Images

To correct the flux variation between the sub-apertures, the diameter $\phi$ of the micro-lenses must be decreased a little such that $P=2\delta$. According to equation (7) one deduces that: $\phi=P^D/D+d=11.99114$ μm. This result could be generalized for a main-lens with a complex optical design. In this case, the distance D is equal to the exit pupil distance of the main-lens.

FIG. 10 present the 4 sub-aperture images obtained with a light-field sensor with micro-image centers being exactly centered on the middle of 2×2 pixels. In that case, no flux variation is observed.

Figure 10A:
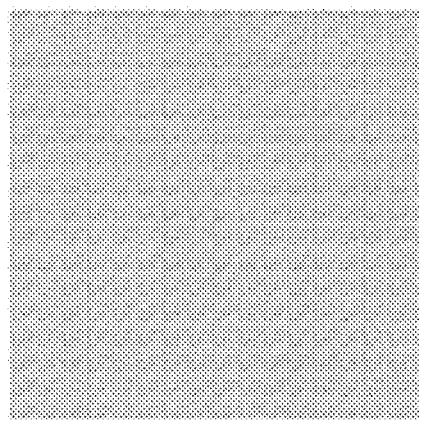
FIG. 10(a) presents an example of a matrix of image views comprising 4 image views S(0, 0), S(1, 0), S(0, 1) and S(1, 1) obtained from a plenoptic camera for which micro-images are exactly equal to 2×2 pixels, according to one embodiment of the disclosure.
Figure 10A:
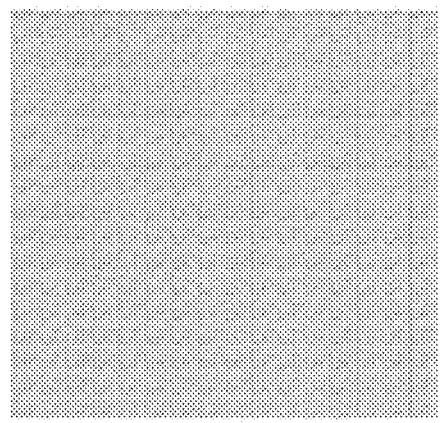
Figure 10A:
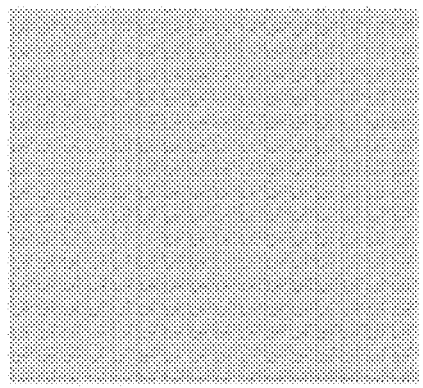
Figure 10A:
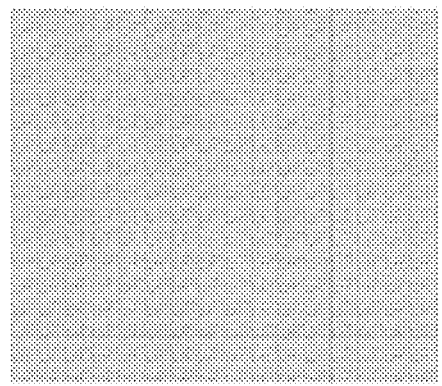
Figure 10B:
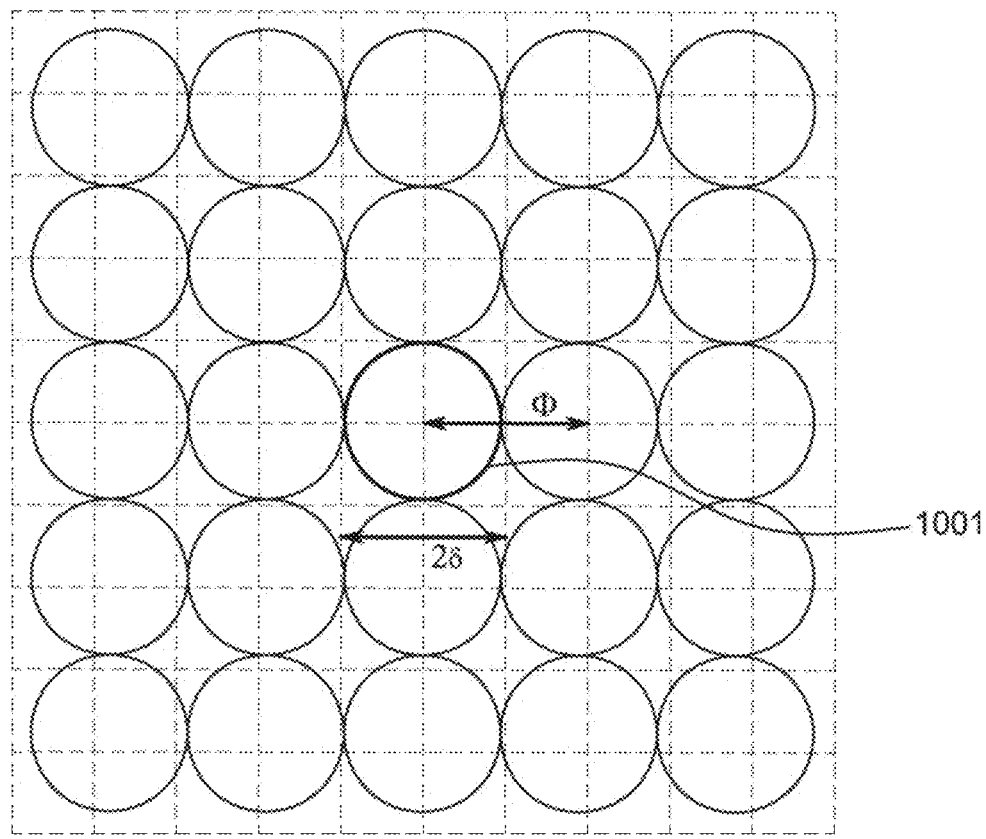
FIG. 10(b) presents the micro-lens array having a step slightly smaller than 2 pixels, such that the corresponding micro-lens images have a step of exactly 2 pixels (which permit to produce sub-aperture images with no flux variation)

In such a design, the step ϕ of the micro-lens array is slightly smaller the distance between 2 pixels. The micro-lens array is positioned such that the micro-lens at the center of the micro-lens array, is exactly aligned with 2×2 pixels at the middle of the sensor. FIG. 10(b) schematically illustrates how the micro-lens array is located compared to the pixel array. In this figure, circles show the micro-lens array, not the micro-lens images. The bold micro-lens referenced 1001 at the middle of the micro-lens array is strictly positioned such that its center is aligned with the middle of 2×2 pixels of the pixel array. This design makes micro-lens images to have strictly 2×2 pixels, thus the sub-aperture images are not subject to flux variation (like in FIG. 10(a))

Figure 11:
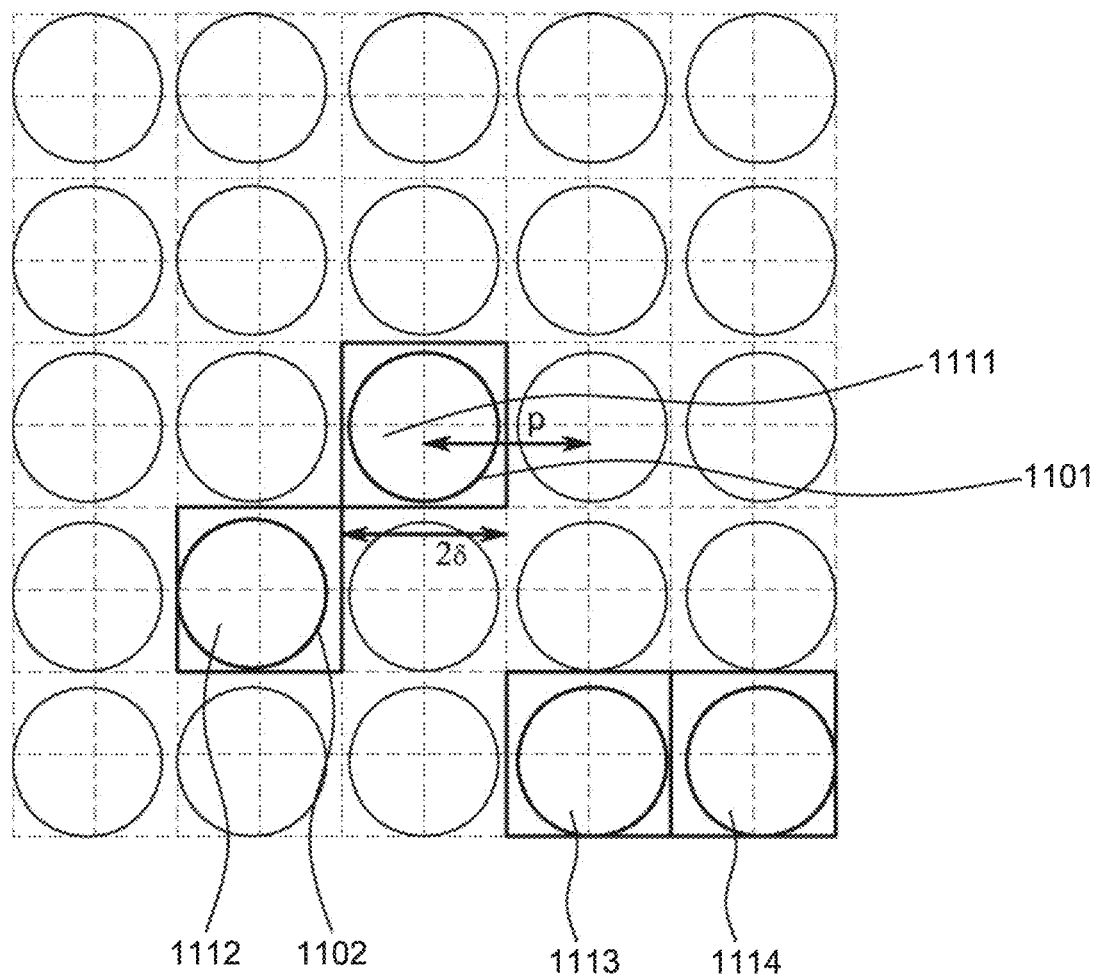
FIG. 11 presents the relative position of the micro-lens images versus the pixel array in a plenoptic camera (where flux variation occurs)

In most cases, the distance p between 2 micro-lens images is slightly larger than an integer number of pixels. FIG. 11 schematically illustrates how the micro-lens images are located compared to the pixel array. The bold micro-lens image referenced 1101 at the middle of the sensor is aligned with the middle of 2×2 pixels of the pixel array (assuming that the corresponding physical micro-lens is also aligned with the middle of the 2×2 pixels of the pixel array). In this figure, circles show the micro-lens images, not the physical micro-lenses. As depicted in FIG. 11, it clearly appears that pixels do not sample the micro-lens images in the same way. For example, the pixel referenced 1111 positioned "below" the micro-lens image 1101 records much less flux than the pixel referenced 1112 located at the "same position" below the micro-lens image referenced 1102. The same remark can be formulated for pixels referenced 1113 and 1114. As the generation process for obtaining a sub-aperture image from a plenoptic image comprises the gathering of pixels located at a same position below each micro-lens, it appears that when pixels 1111, 1112, 1113 and 1114 (among the other pixels located at the "same position" versus the micro-lens images) are used for generating a sub-aperture image, due to the difference of exposition of each pixel, a flux variation occurs in the generated sub-aperture image (as presented in FIGS. 8(a)-(d) for example).

However, by design, the distance between the micro-images can be adapted to be equal to an integer number of pixels, but this design is valid only for a fixed distance D between the main-lens and the micro-lens array (or the exit pupil distance considering a real main-lens). If the main-lens is moved to focus on nearby objects, the distance D varies and the sub-aperture images will receive un-homogeneous flux. Also, if the main-lens can be replaced by other main-lenses (like for interchangeable lens cameras), the distance D will vary (except the ideal case where all the main-lenses share the same exit pupil distance). Therefore, it is common that the flux of the sub-aperture images is not homogeneous through the full field of view.

Fraction of the Micro-Image Captured by a Pixel

The case where p (the distance between two consecutive micro-images in pixel coordinate) is strictly an integer is uncommon. In practice, the sub-aperture images are extracted considering an integer distance between the micro-images [p+0.5]. The extracted sub-aperture images are therefore computed without interpolations, but the sub-aperture images are showing flux variation (as illustrated in FIGS. 8(a)-(d)).

Figure 12A:
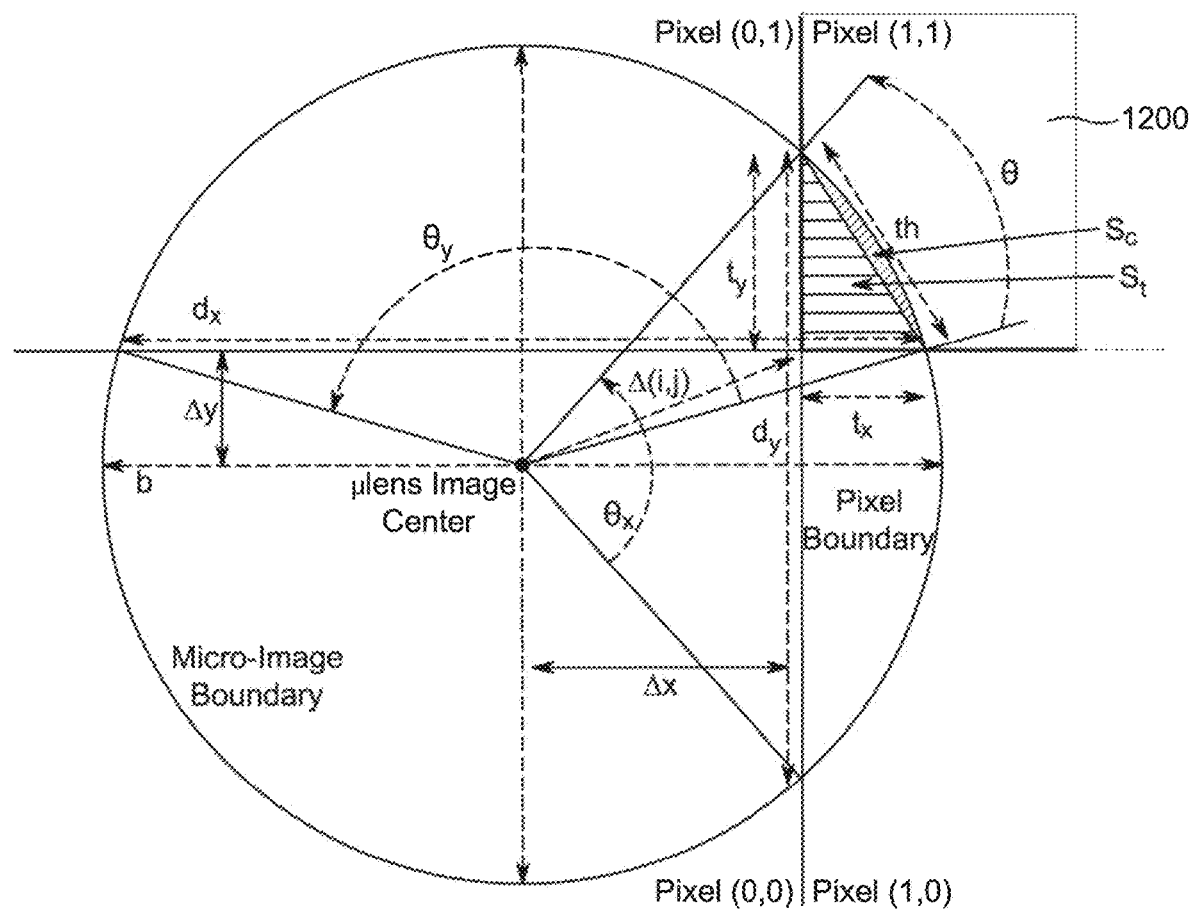
FIG. 12(a) presents a fraction of an acquired micro-image which is split into four decentered pixels.

In order to estimate the fraction of a micro-image captured by a pixel, it is necessary to perform some analysis as detailed in FIG. 12(a). Indeed, the fraction depends on the decentering of the micro-image versus the pixels and the size of the micro-image. More precisely, FIG. 12(a) illustrates a micro-image made of four pixels (not represented at the real scale to highlight the micro-lens decentering) corresponding to pixel (0,0), pixel (0,1), pixel (1,1) and pixel (1,0). The pixel (1,1) is also referenced 1200. The fraction of the micro-image captured by pixel 1200 (not shown completely) can be decomposed into the crosshatching triangle and the dark circular segment. The fraction is small because the micro-image center is far from pixel 1200.

Indeed, FIG. 12(a) illustrates a micro-image split into four pixels, assuming micro-lenses ϕ=2δ covering 2×2 pixels. The decentering between two consecutive micro-images is given by p=ϕe/δ=ϕ(d+D)/Dδ=2d/Dδ+2/δ. Between two consecutive micro-images, the center is drifted by 2d/D pixel. The drift in pixel between the central micro-image (I/2, J/2) and the micro-image (i,j) is equal to Δ(i,j)=(i'2d/D,j'2d/D) where (i',j')=(i−I/2,j −J/2). In general formula Δ(i,j) is proportional to b and (i',j').

The ratio of flux received by a pixel can be modelled assuming that a pixel is equi-sensitive to any photons which hit its surface ($\delta^2$). To compute the ratio $R_{1,1}(i,j,b)$ of the micro-image captured by the pixel 1200, one needs to compute the surface $S_t$ of the hashed triangle, and the surface $S_c$ of the gray circular segment. To measure these 2 surfaces, one needs to characterize the various distances and angles following circular segment mathematics.

| Parameters | Value |
|---|---|
| b | $\delta\Phi d/D$ |
| $\Delta(i, j)$ | $(\Delta_x, \Delta_y) = \left(\dfrac{i'2d}{D}, \dfrac{j'2d}{D}\right)$ |
| $\theta_x$ | $2\arccos\left(\dfrac{2\Delta_x}{b}\right)$ |
| $\theta_y$ | $2\arccos\left(\dfrac{2\Delta_y}{b}\right)$ |
| $d_x$ | $b\sin\dfrac{\theta_y}{2}$ |
| $d_y$ | $b\sin\dfrac{\theta_x}{2}$ |
| $t_x$ | $\dfrac{d_x}{2} - \Delta_x = \dfrac{1}{2}b\sin\dfrac{d_y}{2} - \Delta_x$ |
| $t_y$ | $\dfrac{d_y}{2} - \Delta_y = \dfrac{1}{2}b\sin\dfrac{d_x}{2} - \Delta_y$ |
| $t_h$ | $\sqrt{t_x^2 + t_y^2}$ |
| $\theta$ | $2\operatorname{asin}\dfrac{t_h}{2}$ |
| $S_t$ | $\dfrac{t_x t_y}{2}$ |
| $S_c$ | $(\theta - \sin\theta)\dfrac{b^2}{8}$ |
| $R_{1,1}(i, j, b)$ | $(S_t + S_c)\dfrac{4}{\pi b^2}$ |

The previous table summarizes the ratio of micro-image received by the pixel (1,1) also named pixel 1200. The ratio $R_{u,v}(i,j)$ of the 3 other pixels is computed by mirror of the decentering $\Delta(i,j)$:

$$R_{0,0}(i,j,b) = R_{1,1}(-i,-j,b)$$

$$R_{0,1}(i,j,b) = R_{1,1}(-i,j,b)$$

$$R_{1,0}(i,j) = R_{1,1}(i,-j,b)$$

In summary, the flux received by a pixel within a sub-aperture image (i,j) relative to the complete sub-aperture image depends on 3 parameters:

The lens coordinate (i,j) which defines the amount of decentering $$\Delta(i,j) = (\Delta_x, \Delta_y) = \left(\frac{i'2d}{D}, \frac{j'2d}{D}\right);$$

The diameter of the micro-image $b = \delta\phi d/D$; and
The pixel coordinate (x,y) which is converted into (u,v) = (x mod [p], y mod [p]) the coordinate within the micro-image (as shown in FIGS. 6(*a*) and 6(*b*)).

Simpler model Fraction of the micro-image captured by a pixel

The literal formulation of the ratios is quite complex. A simpler model is proposed to approximate the ratio with a shorter formula:

$$\tilde{R}_{1,1}(i,j,b) = \frac{1}{4}\left(\sin\left(\frac{2\sqrt{2}(\Delta_x + \Delta_y)}{b}\right) + 1\right)e^{\frac{4\Delta_x \Delta_y}{b^2}}$$

Figure 12B:
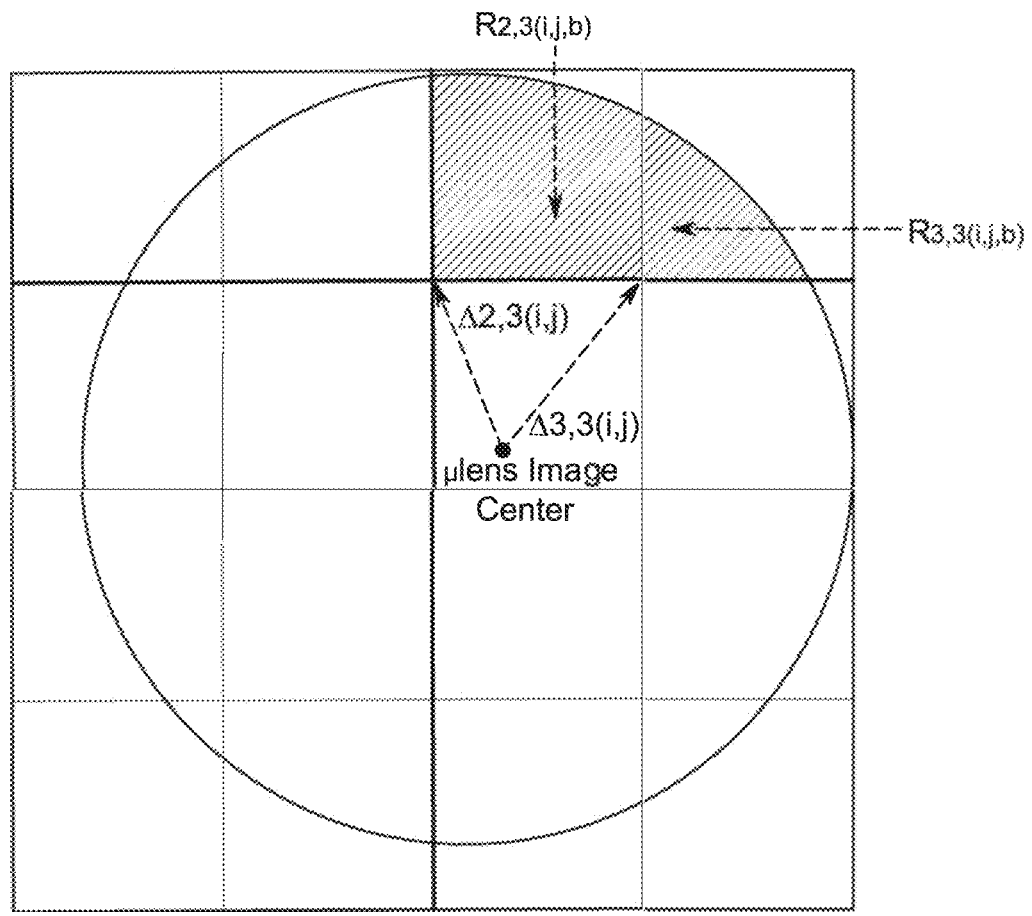
FIG. 12(b) schematically illustrates how to compute various ratios $R_{u,v}$ in case a micro-image covers 4 by 4 pixels.
Figure 13A:
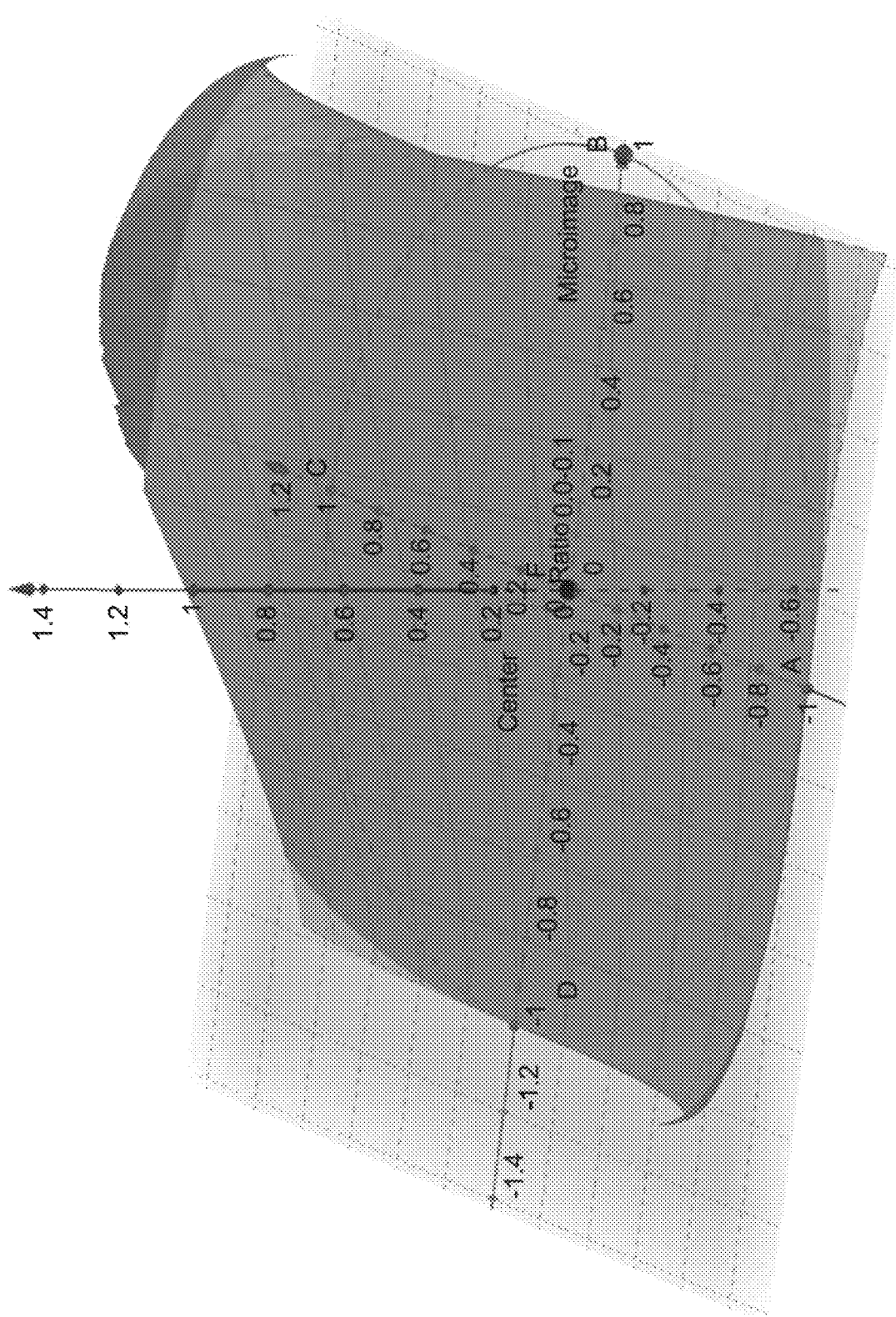
FIG. 13(a) presents a graph of the ratio of flux $R_{1,1}(i,j,b)$ received by the pixel (1,1) in FIG. 12(a)
Figure 13B:
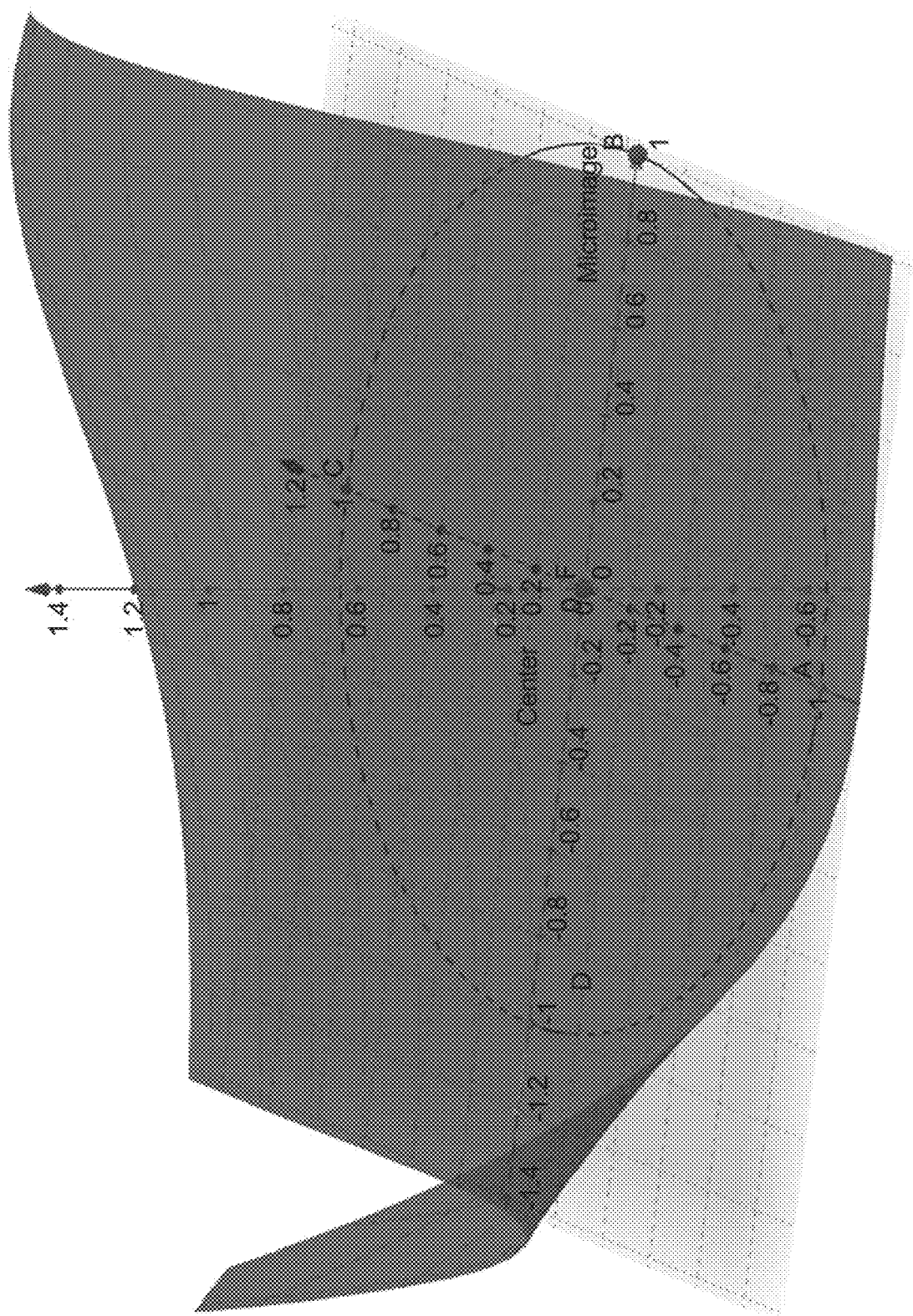
FIG. 13(b) presents a graph, based on a model, of the ratio of flux $\tilde{R}_{1,1}(i,j,b)$ received by the pixel (1,1) in FIG. 12(a)

The FIG. 13(*a*) presents a graph of the ratio of flux $R_{1,1}(i,j,b)$ received by the pixel (1,1) in FIG. 12(*a*).

The FIG. 13(*b*) presents a graph, based on a model, of the ratio of flux $\tilde{R}_{1,1}(i,j,b)$ received by the pixel (1,1) in FIG. 12(*a*).

The error between $R_{1,1}(i,j,b)$ and $\tilde{R}_{1,1}(i,j,b)$ is bellow 3% for shifts within the disk:

$$\sqrt{(\Delta_x^2 + \Delta_y^2)} < \frac{b}{2}.$$

It should be noted that the previous embodiment is described with a plenoptic camera for which each micro-image is made up of 4 pixels as depicted in FIG. 11 (or FIG. 12(*a*)). However, one skilled in the art can adapt the teachings in such configuration to other embodiments where each micro-image is made up of more pixels (for example 16 pixels as in the context of FIG. 6(*a*); it should be noted that in the context of FIG. 6(*a*), no drift occurs), and where a drift of the micro-image centers occurs. FIG. 12(*b*) schematically illustrates how to compute the various ratios $R_{u,v}$ in case a micro-image is covering 4 by 4 pixels. The ratios $R_{3,3}(i,j,b)$ is computed easily as described above considering the shift $\Delta_{3,3}(i,j)$. The ratios $R'_{2,3}(i,j,b) = R_{2,3}(i,j,b) + R_{3,3}(i,j,b)$ illustrated by the gray surface is also computed easily considering the shift $\Delta_{2,3}(i,j)$. $R'_{2,3}$ and $R'_{2,3}$ being computed, one deduces $R_{2,3}$. Iteratively, all the $R_{u,v}$ are computed.

Encoding Plenoptic Images

To encode plenoptic images it is convenient to convert them into the sub-aperture images. Then the MVC standard can be used to encode the sub-aperture images. This way of encoding is optimum if the sub-aperture images are extracted with [p] such that no interpolation is required (sub-aperture images and raw image are equivalent as illustrated in FIGS. 6(*a*) and (*b*)).

In addition, the encoding of sub-apertures images is also a preference choice especially for plenoptic sampling with small micro-images (p<6 pixel for instance). Indeed, with small micro-images it is hard to encode a micro-image versus another micro-image according to a motion vector. The blocks being used require to be smaller than the size of a micro-image.

Multiview Video Coding

For reminder, the Multiview Video Coding (MVC) standard is dedicated to several images of the same scene as typically taken by a matrix of cameras. It should be noted that, in the following, by abuse of notation, when a reference to the MVC standard is done, such reference should apply to all the standards in which encoding of Multiview images is envisioned (as for example MPEG/H.264-MV, or MV-HEVC, etc.).

In order to exploit inter-camera redundancy, the MVC standard defines inter-view prediction. This feature is needed since the various view of the scene are redundant even though the parallax from different views is varying. Hence, inter-view prediction is a key-element of MVC which permit to decrease a video coding by an average of 25% compared to the independent coding of the views.

MVC defines one reference view to be coded according to conventional 2D video codec, and the other view can benefit from the reference view to produce to inter-view coding.

MVC and Flux Variation Between Sub-Apertures

Figure 14A:
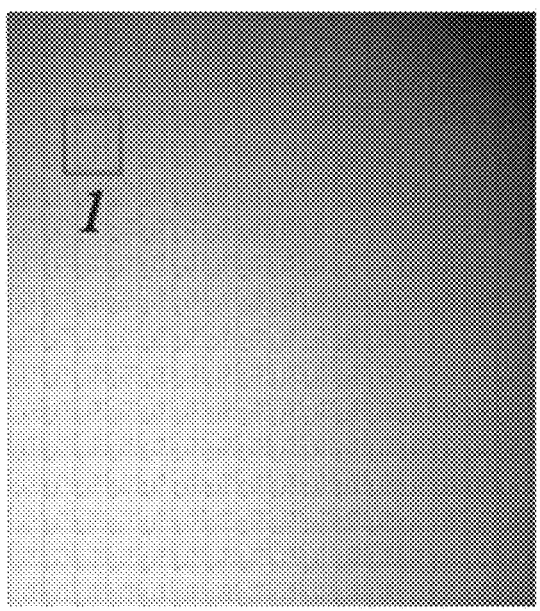
FIGS. 14(a) and 14(b) illustrate the impact of a flux variation between two image blocks of two different sub-aperture images (or images views)
Figure 14B:
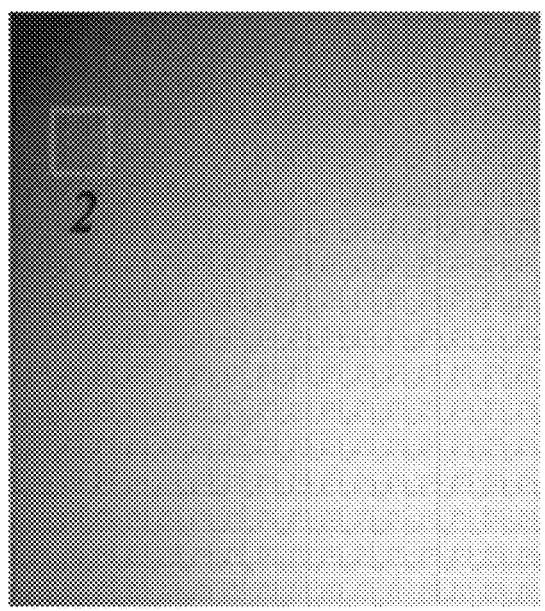
Figure 15A:
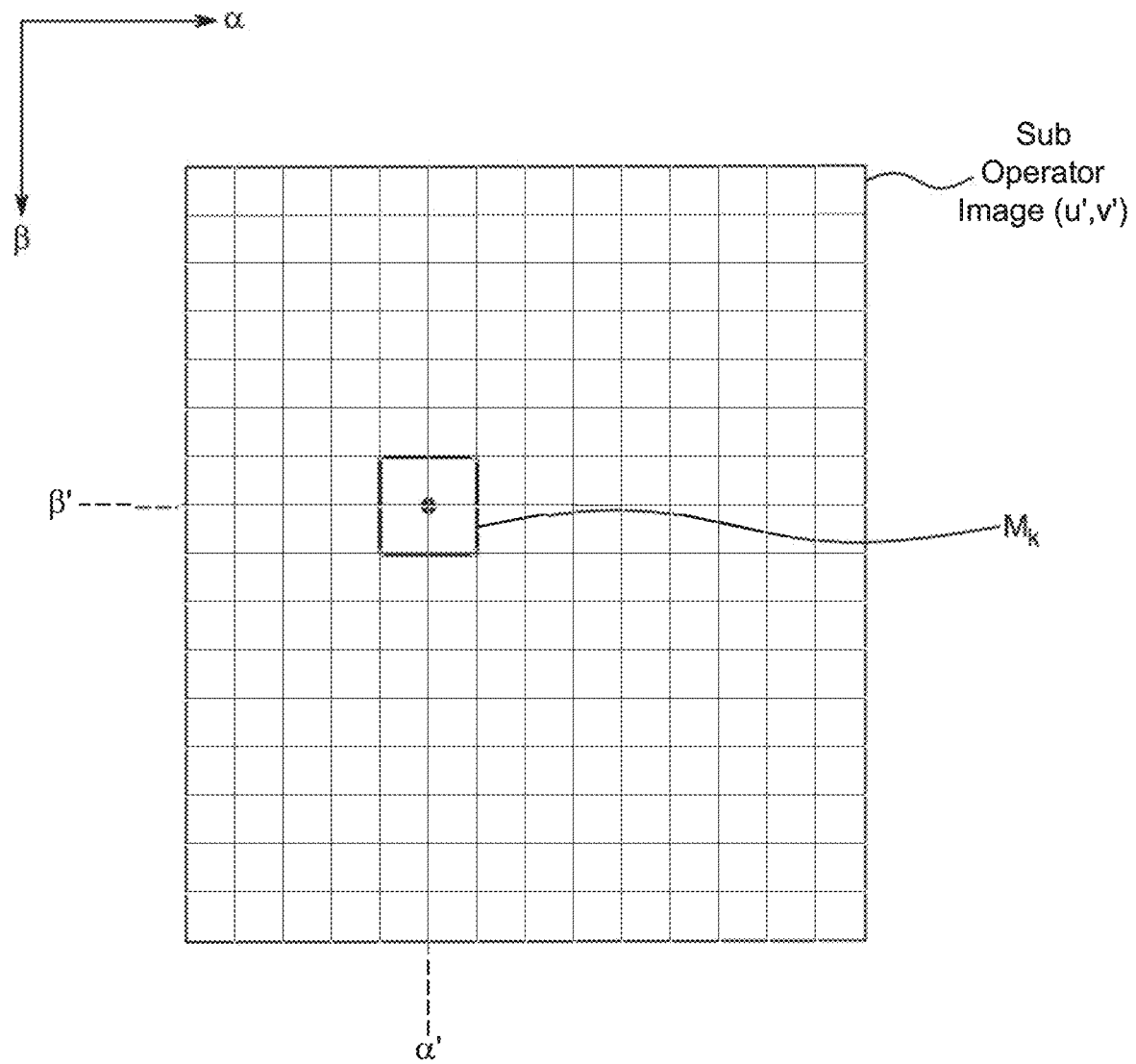
FIGS. 15(a)-(e) illustrate different representations of the same block image $M_k$ within a sub-aperture image (at coordinates (u', v')), said block image $M_k$ being associated with a pixel at coordinates (a', β')
Figure 15B:
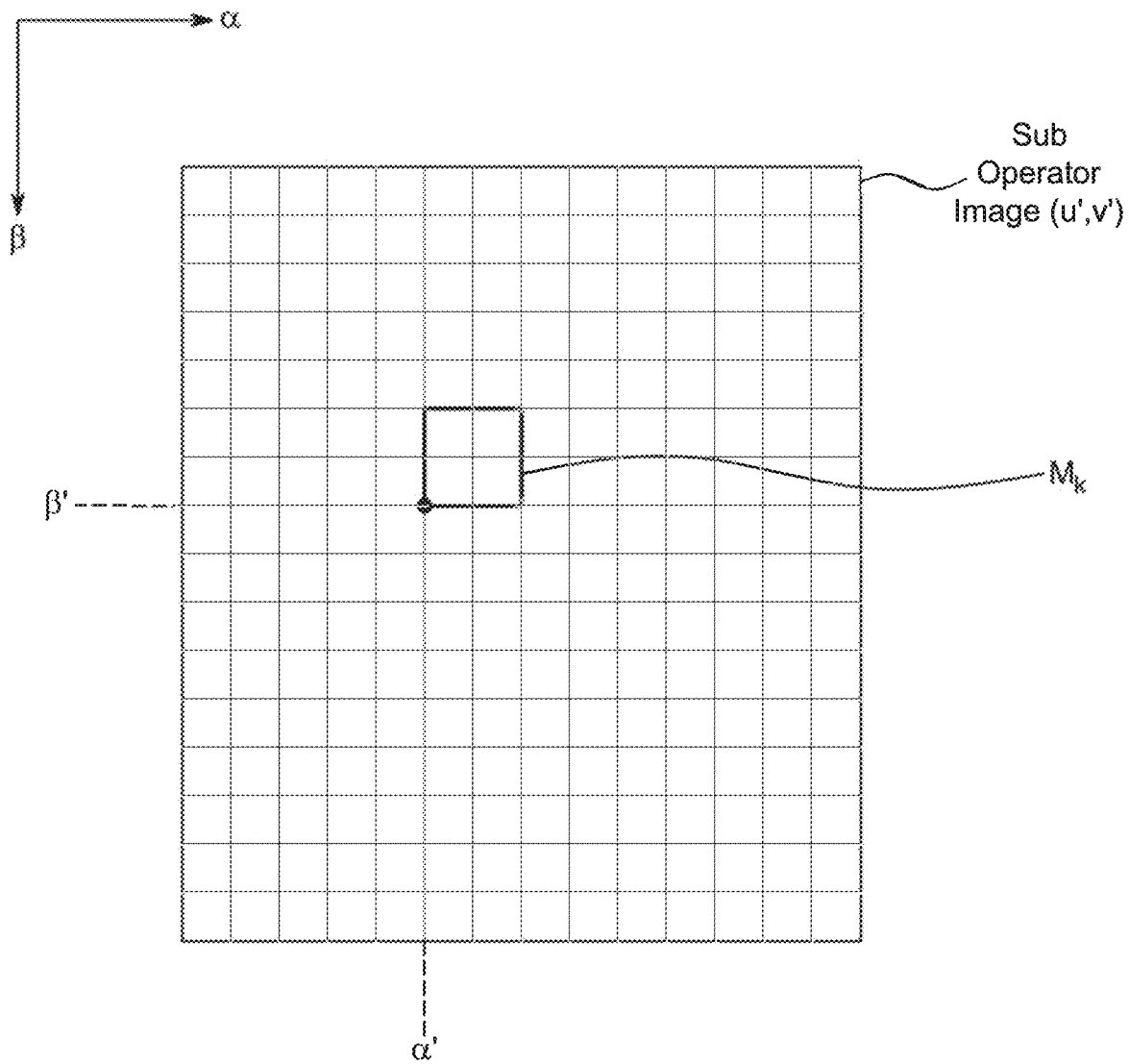
Figure 15C:
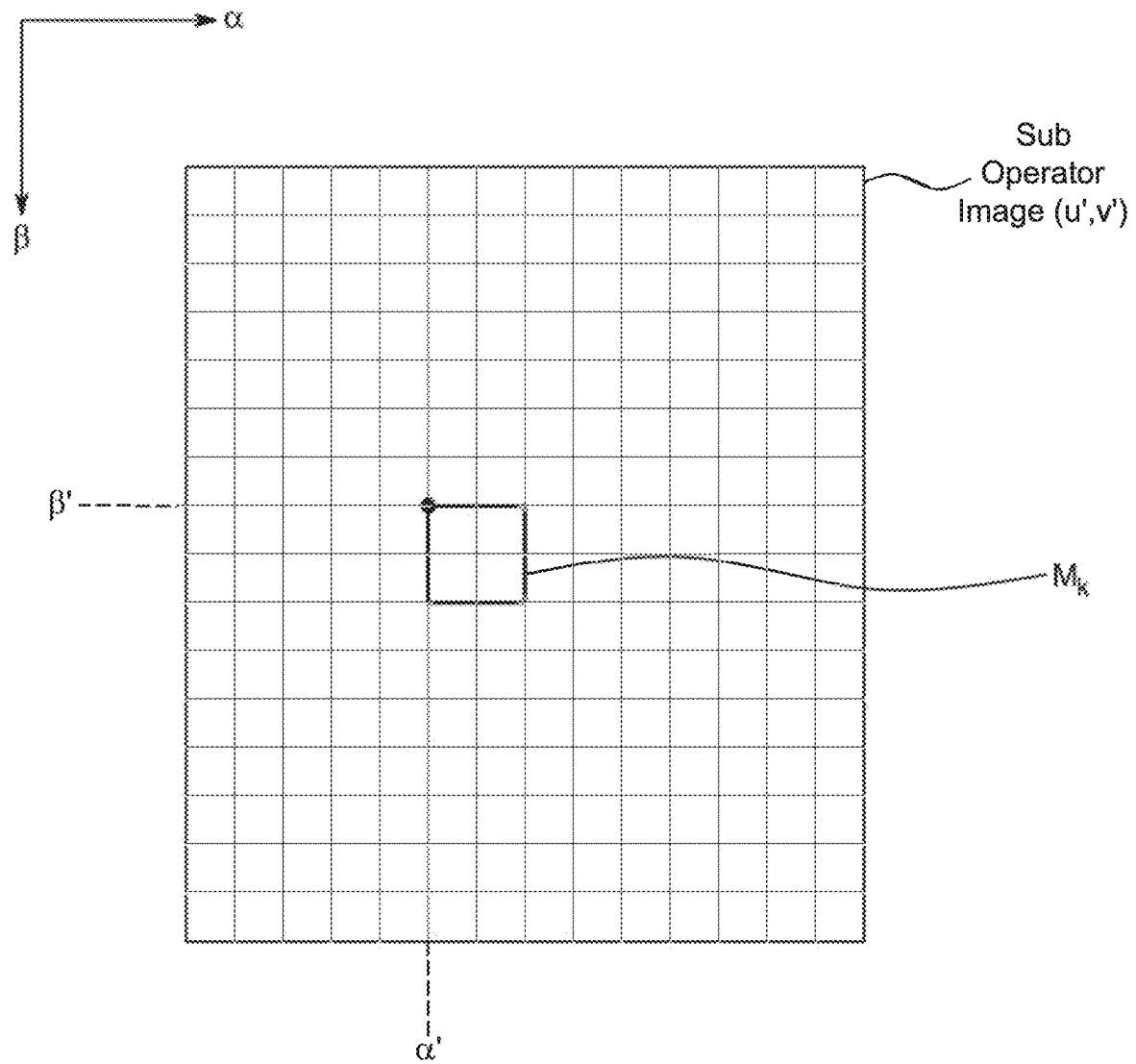
Figure 15D:
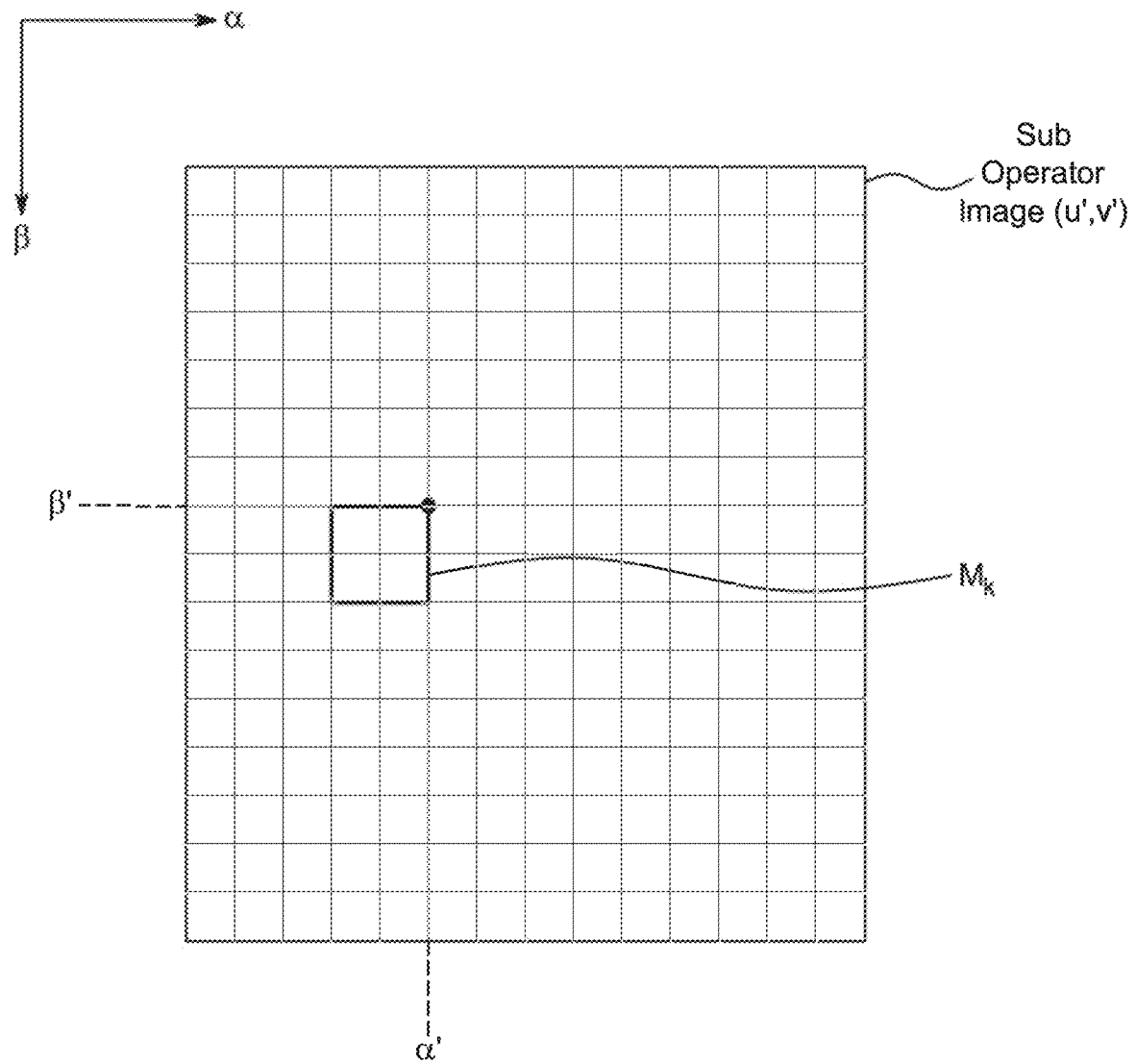
Figure 15E:
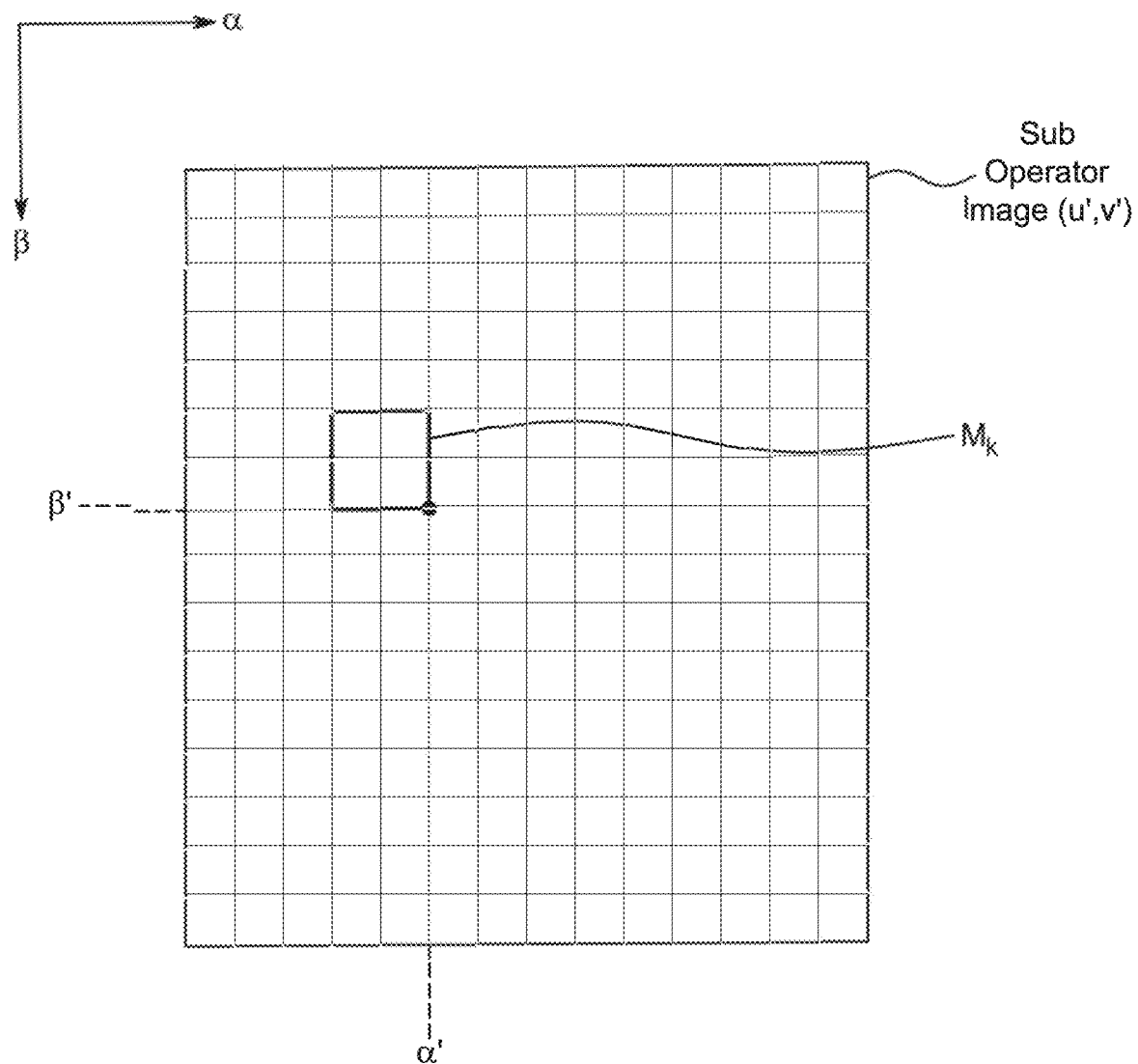

Using MVC on the sub-aperture images allows prediction between block images spread on various sub-aperture images. But the flux variation within each sub-aperture images and among the sub-aperture images, makes residual blocks between blocks of pictures artificially strong as illustrated in FIGS. 14(*a*) and 14(*b*). For instance, the block image or block of picture 1 in FIG. 14(*a*) is associated with the block image or block of picture 2 in FIG. 14(*b*) corresponding to a second sub-aperture image. The residual block between these two blocks of pictures will not have a null average, thus requiring a high coding rate. It should be noted that HEVC proposes in a specific mode to weight the reference blocks with a flux-scale. The optimal weigh is estimated such that the blocks to encode has few residuals compared to the weighted reference block. Therefore, the residual has a null average and is easier to encode. But the residual will be encoded with the flux-scale, which implies an additional data to be transmitted. By contrast, the proposed invention is proposing a flux-scale which depends on a model which needs to be transmitted once only.

In one embodiment of the disclosure, it is proposed to use ratios to normalize the flux of the block of pictures when they are compared with another one to extract a residual. Hence, at least one goal of the present disclosure is to propose a technique for obtaining residuals having a null average which is likely to be more compressed.

Encoding a Raw Plenoptic Image According to one Embodiment of the Disclosure

In a step referenced 101, an electronic device extracts the sub-aperture images from the raw plenoptic image. The sub-aperture images are extracted by pixel de-interleaving as illustrated in FIGS. 6(*a*) and (*b*) (Sub aperture image are extracted considering [p]. One can obtain I×J sub-aperture images. Such generation process is also depicted in document GB 2535475 (especially the FIGS. 4*b* and 4*c* of document GB 2535475).

Then, in a step referenced 102, the electronic device can select one of the sub-aperture image as the reference view for an MVC encoder.

In a step referenced 103, the electronic device performs the encoding of the other image views as follows (the other sub-aperture images are defined as views for the MVC encoder):

A block image $M_1(u_1, v_1, \alpha_1, \beta_1)$ is extracted from the sub-aperture image $(u_1, v_1)$ at coordinate $(\alpha_1, \beta_1)$. A second block image $M_2(u_2, v_2, \alpha_2, \beta_2)$ is extracted from the sub-aperture image $(u_2, v_2)$ at coordinates $(\alpha_2, \beta_2)$. It should be noted that the block images $M_1$ and $M_2$ might be extracted from the same sub-aperture image (intra coding within the same view), or from 2 distinct sub-aperture images (intra coding within the same multi-view image), or within sub-aperture images from consecutive temporal images. It should be noted that when we discuss of a block image $M_k$ from the sub-aperture image $(u', v')$ at coordinates $(\alpha', \beta')$ with a given size (for example $2^N \times 2^N$ with N=2, 3,4 or 5), such block image $M_k$ can either have for center the pixel at coordinates $(\alpha', \beta')$ as depicted in FIG. 15(*a*), or have, as left bottom pixel, the pixel at coordinates $(\alpha', \beta')$ as depicted in FIG. 15(*b*), or have, as left top pixel, the pixel at coordinates $(\alpha', \beta')$ as depicted in FIG. 15(*c*), or have, as right top pixel, the pixel at coordinates $(\alpha', \beta')$ as depicted in FIG. 15(*d*), or have, for right bottom pixel, the pixel at coordinates $(\alpha', \beta')$ as depicted in FIG. 15(*e*). In addition, as reminded previously, each of the pixels from the sub-aperture image $(u', v')$ come from a pixel from the sensor pixel of a plenoptic camera, and more precisely, each pixel from the sub-aperture image $(u', v')$ is associated with a micro-lens (see FIGS. 6(*a*) and (*b*)).

In the case the two block images $M_1$ and $M_2$ fulfill a block matching criterion (i.e. a residual is below a given threshold) then, instead of encoding straightforwardly the residual, it is proposed, according to one embodiment of the disclosure, to determine a modified residual by determining the pixel values of the residual block between block images $M_1$ and $M_2$ with the values of modified pixels of the block image $M_1$ and $M_2$: the pixels of the block images $M_1$ and $M_2$ are first normalized (or divided) by the ratio $R_{u_1,v_1}(\alpha_1, \beta_1)$ and $R_{u_2,v_2}(\alpha_2, \beta_2)$ respectively. Indeed, all the pixels of the block image $M_1$ are divided by $R_{u_1,v_1}(\alpha_1, \beta_1)$, and by all the pixels of the block image $M_2$ are divided by $R_{u_2,v_2}(\alpha_2, \beta_2)$. From a practical point of view, such modification is enough for taking into account the decentering of the pixels in the pixel sensor associated with the pixels at coordinates $(\alpha_1, \beta_1)$ or $(\alpha_2, \beta_2)$. The modified residual is then encoded according to the HEVC standard. In a variant (which is a more complex embodiment in term of computation), each pixel of a block image is divided by a specific ratio associated with the micro-lens related to it.

In one embodiment of the disclosure, for each multi-view which is encoded, the two parameters b=δϕd/D and e'=d/D are also sent as metadata. These parameters are deduced by knowing the physical properties of the plenoptic camera.

Decoding a Raw Plenoptic Image According to One Embodiment of the Disclosure

In a step referenced 201, an electronic device decodes the reference view of the MVC encoded sequence is decoded.

Then, in a step referenced 202, the electronic device obtains some special metadata (as for example the values b and e' which can be extracted from the metadata associated with the encoded multi-image).

In addition, the electronic device performs, in a step referenced 203, the decoding of other image views as follows (the other sub-aperture images associated to the views of the MVC are decoded):

In case of a residual $Res_{1,2}$ is extracted from the encoded sequence and corresponds to the comparison between the already decoded block $M_1(u_1, v_1, \alpha_1, \beta_1)$ and the unknown block $M_2(u_2, v_2, \alpha_2, \beta_2)$, the pixel (l, m) values of $M_2[l, m]$ are computed as follows:

$$M_2[l, m] = \left(\frac{M_1[l, m]}{R_{u_1,v_1}(\alpha_1, \beta_1)} + Res_{1,2}[l, m]\right) R_{u_2,v_2}(\alpha_2, \beta_2)$$

The Ratios $R_{u_1,v_1}(\alpha_1, \beta_1)$ and $R_{u_2,v_2}(\alpha_2, \beta_2)$ are computed since the coordinates of the 2 blocks $M_x$ are known $(u_x, v_x, \alpha_x, \beta_x)$ and the parameters b and e' permit to compute the ratios $R_{u_1,v_1}(\alpha_1, \beta_1)$ and $R_{u_2,v_2}(\alpha_2, \beta_2)$.

In another embodiment of the disclosure, the parameters b and e' are estimated on the sub-aperture images without prior knowledge on the optical characteristics of the plenoptic cameras (expect [p] the number of pixels per micro-lens images). The estimation is performed by the encoder which associates several couple of blocks $(M_1, M_2)$ and compute the parameters b and e' using least square estimator according the model of the Ratios.

In another embodiment, even though the plenoptic sensor is built such that the micro-lens image diameter is strictly equal to an integer number of pixels, the sub-aperture images might show some flux variation from corners to corners. Indeed, the optical aberrations of the main-lens such that the geometrical distortion makes photons passing through a quarter of the main-lens pupil to be recorded by a sub-aperture image which is associated to another quarter pupil. Thus, some optical aberrations produce flux variation between sub-aperture images independently to the sub-aperture flux variation caused by the micro-image sizes. These variations do not follow necessarily the model previously presented. One skilled in the art can determine a set of parameters for achieving the expected goal. This set of parameters can be deduced by the encoder and transmitted to the decoder.

Figure 16:
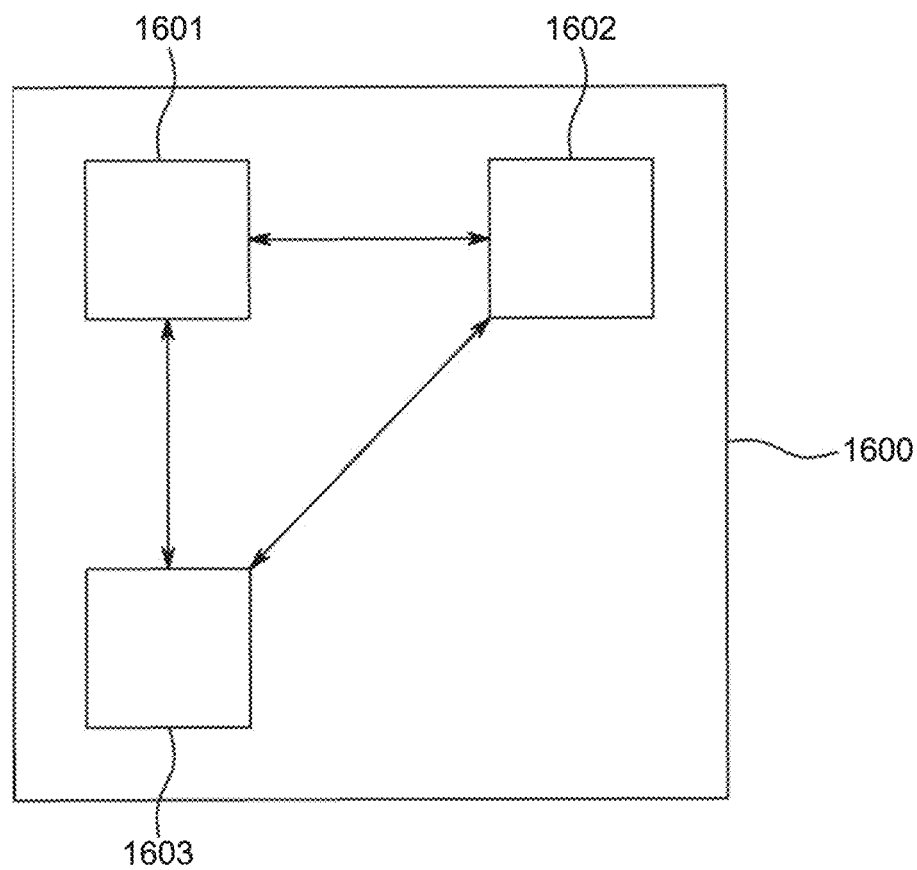
FIG. 16 presents in a schematic drawing an example of a device that can be used to perform one or several steps of methods disclosed in the present document.

FIG. 16 presents an example of a device that can be used to perform one or several steps of methods disclosed in the present document.

Such device referenced 1600 comprises a computing unit (for example a CPU, for "Central Processing Unit"), referenced 1601, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1602. Computer programs are made of instructions that can be executed by the computing unit. Such device 1600 can also comprise a dedicated unit, referenced 1603, constituting an input-output interface to allow the device 1600 to communicate with other devices. In particular, this dedicated unit 1603 can be connected with an antenna (in order to perform communication without contacts), or with serial ports (to carry communications "contact"). It should be noted that the arrows in FIG. 16 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 16.

The invention claimed is:

1. A method for encoding at least one matrix of image views obtained from data acquired by a plenoptic camera, wherein image views of said matrix of image views are partitioned into blocks, the method being characterized in that it comprises, for a given image view of said at least one matrix of views:
   obtaining at least one block to be encoded and a matching block, wherein a difference between said at least one block to be encoded and said matching block fulfills a block matching criterion;
   determining flux variation parameters associated with characteristics of a micro lens array and a pixel sensor of said plenoptic camera;
   determining a residual block regarding said at least one block to be encoded and said matching block, said determining comprising using modified pixels of said least one block to be encoded and modified pixels of said matching block according to the flux variation parameters;
   encoding said residual block to form an encoded residual block; and
   providing, along with said encoded residual block, metadata including said flux variation parameters.

2. The method for encoding according to claim 1, wherein said flux variation parameters are defined according to an estimation of decentering of micro-images centers compared to pixels alignments associated with micro-images.

3. The method for encoding according to claim 1, wherein said matching block is comprised in said given image view.

4. The method for encoding according to claim 1, wherein said matching block is comprised in a reference image view comprised in said at least one matrix of image views, or in another matrix of image views.

5. The method for encoding according to claim 1, wherein said at least one block to be encoded and said matching block are prediction blocks according to HEVC standard.

6. The method for encoding according to claim 1, wherein said at least one block to be encoded and said matching block are blocks according to H.264 standard.

7. The method for encoding according to claim 1, wherein said block matching criterion is defined by a threshold value.

8. A method for decoding at least one matrix of encoded image views obtained from data acquired by a plenoptic camera, wherein the encoded image views of said at least one matrix of image views comprise encoded blocks, and said method being characterized in that it comprises, for a given encoded image view of said at least one matrix:
   obtaining a predictor block and a residual block;
   obtaining, from metadata provided with said encoded image view, flux variation parameters associated with characteristics of a micro lens array and a pixel sensor of said plenoptic camera; and
   obtaining pixels of a block to be decoded according to said residual block, said predictor block and the flux variation parameters.

9. The method for decoding according to claim 8, wherein said flux variation parameters are defined according to an estimation of decentering of micro-images centers compared to pixels alignments associated with micro-images.

10. The method for decoding according to claim 8, wherein said predictor block corresponds to block $M_1(u_1, v_1, \alpha_1, \beta_1)$, noted $M_1[\alpha_1, \beta_1]$, which is comprised in an image view at coordinates $(u_1, v_1)$ and related to pixel at coordinates $(\alpha_1, \beta_1)$, and said block to be decoded corresponds to block $M_2(u_2, v_2, \alpha_2, \beta_2)$, noted $M_2[\alpha_2, \beta_2]$ which is comprised in an image view at coordinates $(u_2, v_2)$ and related to pixel at coordinates $(\alpha_2, \beta_2)$, and wherein said obtaining pixels comprises obtaining value of pixel at coordinates (l, m) within said block $M_2(u_2, v_2, \alpha_2, \beta_2)$, via the following equation:

$$M_2[l, m] = \left(\frac{M_1[l, m]}{R_{u_1,v_1}(\alpha_1, \beta_1)} + Res_{1,2}[l, m]\right) R_{u_2,v_2}(\alpha_2, \beta_2)$$

where the ratios $R_{u_1,v_1}(\alpha_1, \beta_1)$ and $R_{u_2,v_2}(\alpha_2, \beta_2)$ are ratios of flux associated with pixels, and $Res_{1,2}[l, m]$ corresponds to a pixel value at coordinates (l, m) in said residual block.

11. The method for decoding according to 10, wherein it comprises determining said ratios $R_{u_1,v_1}(\alpha_1, \beta_2)$ and $R_{u_2,v_2}(\alpha_2, \beta_2)$ from parameters $\delta$, $\Phi$, d and D, where $\delta$ is a physical size of a pixel in said pixel sensor in said plenoptic camera, $\Phi$ is a diameter of a main lens in said plenoptic camera, d is a distance between a micro-lens array in said plenoptic camera and said pixel sensor, and D is a distance between said main lens and said micro-lens array.

12. An electronic device for encoding at least one matrix of image views obtained from data acquired by a plenoptic camera, wherein image views of said matrix of image views are partitioned into blocks, the electronic device comprising a processor and at least one memory unit coupled to said processor, and for a given image view of said at least one matrix of views, the processor is configured to:
   obtain at least one block to be encoded and a matching block, wherein a difference between said at least one block to be encoded and said matching block fulfills a block matching criterion;
   determine flux variation parameters associated with characteristics of a micro lens array and a pixel sensor of said plenoptic camera;
   determine a residual block regarding said at least one block to be encoded and said matching block, that comprises a use of modified pixels of said least one block to be encoded and modified pixels of said matching block according to the flux variation parameters;
   encode said residual block to form an encoded residual block; and
   provide, along with said encoded residual block, metadata including said flux variation parameters.

13. The electronic device for encoding according to claim 12, wherein said flux variation parameters are defined according to an estimation of decentering of micro-images centers compared to pixels alignments associated with micro-images.

14. An electronic device for decoding at least one matrix of encoded image views obtained from data acquired by a plenoptic camera, wherein the encoded image views of said at least one matrix of image views comprise encoded blocks, and the electronic device comprising a processor and at least one memory unit coupled to said processor, and, for a given encoded image view of said at least one matrix, the processor is configured to:

obtain a predictor block and a residual block;
obtain, from metadata provided with said encoded image view, flux variation parameters associated with characteristics of a micro lens array and a pixel sensor of said plenoptic camera; and
obtain pixels of a block to be decoded according to said residual block, said predictor block and the flux variation parameters.

15. The electronic device for decoding according to claim 14, wherein said predictor block corresponds to block $M_1(u_1, v_1, \alpha_1, \beta_1)$, noted $M_1[\alpha_1, \beta_1]$, which is comprised in an image view at coordinates $(u_1, v_1)$ and related to pixel at coordinates $(\alpha_1, \beta_1)$, and said block to be decoded corresponds to block $M_2(u_2, v_2, \alpha_2, \beta_2)$, noted $M_2[\alpha_2, \beta_2]$ which is comprised in an image view at coordinate $(u_2, v_2)$ and related to pixel at coordinates $(\alpha_2, \beta_2)$, and wherein said obtaining pixels comprises obtaining value of pixel at coordinates $(l, m)$ within said block $M_2(u_2, v_2, \alpha_2, \beta_2)$, via the following equation:

$$M_2[l, m] = \left( \frac{M_1[l, m]}{R_{u_1, v_1}(\alpha_1, \beta_1)} + Res_{1,2}[l, m] \right) R_{u_2, v_2}(\alpha_2, \beta_2)$$

where the ratios $R_{u_1,v_1}(\alpha_1, \beta_1)$ and $R_{u_2,v_2}(\alpha_2, \beta_2)$ are ratios of flux associated with pixels, and $Res_{1,2}[l, m]$ corresponds to a pixel value at coordinates $(l, m)$ in said residual block.

* * * * *